US008582593B2

(12) United States Patent
Chen et al.

(10) Patent No.: US 8,582,593 B2
(45) Date of Patent: Nov. 12, 2013

(54) MULTICAST TRANSMISSION WITHIN A HYBRID DIRECT AND CELLULAR COMMUNICATION SYSTEM

(75) Inventors: Tao Chen, Oulu (FI); Sami-Jukka Hakola, Oulu (FI); Timo K. Koskela, Oulu (FI)

(73) Assignee: Nokia Corporation, Espoo (FI)

( * ) Notice: Subject to any disclaimer, the term of this patent is extended or adjusted under 35 U.S.C. 154(b) by 776 days.

(21) Appl. No.: 12/648,363

(22) Filed: Dec. 29, 2009

(65) Prior Publication Data

US 2011/0159799 A1  Jun. 30, 2011

(51) Int. Cl.
*H04J 3/26* (2006.01)
(52) U.S. Cl.
USPC .......................................... 370/432; 370/310
(58) Field of Classification Search
USPC ......... 370/432, 310, 252, 312, 231, 241, 328, 370/329, 394, 338, 468, 473, 474; 709/223, 709/245, 224
See application file for complete search history.

(56) References Cited

U.S. PATENT DOCUMENTS

| 6,415,312 | B1 | 7/2002 | Boivie ........................... 709/200 |
|---|---|---|---|
| 7,308,266 | B2 | 12/2007 | Du et al. ........................ 455/445 |
| 2002/0152299 | A1* | 10/2002 | Traversat et al. ............. 709/223 |
| 2005/0002363 | A1* | 1/2005 | Cheng et al. .................. 370/338 |
| 2005/0160345 | A1* | 7/2005 | Walsh et al. .................. 714/776 |
| 2005/0182995 | A1* | 8/2005 | Curcio et al. ................. 714/748 |
| 2006/0168343 | A1* | 7/2006 | Ma et al. ....................... 709/245 |
| 2008/0031177 | A1* | 2/2008 | Lee et al. ...................... 370/312 |
| 2008/0186847 | A1* | 8/2008 | Aluru et al. ................... 370/231 |
| 2009/0011770 | A1* | 1/2009 | Jung et al. .................. 455/452.1 |
| 2009/0046650 | A1* | 2/2009 | Dalsgaard et al. ............. 370/329 |
| 2009/0327829 | A1* | 12/2009 | Yang et al. .................... 714/749 |
| 2011/0038376 | A1* | 2/2011 | Wiemann et al. ............. 370/394 |
| 2011/0158186 | A1* | 6/2011 | Shihab .......................... 370/329 |
| 2012/0020213 | A1* | 1/2012 | Horneman et al. ........... 370/231 |

FOREIGN PATENT DOCUMENTS

| WO | WO 2005/060182 A1 | 6/2005 |
|---|---|---|
| WO | WO 2005/078983 A1 | 8/2005 |
| WO | WO 2006/075277 A1 | 7/2006 |
| WO | WO 2010/102668 A1 | 9/2010 |

OTHER PUBLICATIONS $3^{rd}$ Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913, V8.0.1 (Mar. 2009), 15 pages.

(Continued)

*Primary Examiner* — Abdullah Riyami
(74) *Attorney, Agent, or Firm* — Harrington & Smith

(57) ABSTRACT

In one, non-limiting exemplary embodiment, a method includes: sending a multicast transmission from a source device to a base station in a wireless communication system, where the multicast transmission is for a plurality of receiving devices including a local receiving device, where the source device and the local receiving device are members of a local cluster that is at least partially located in a cell serviced by the base station; receiving, by the source device, a transmission of feedback information as it is transmitted from the local receiving device to the base station; and in response to the source device determining that the feedback information includes an indication that the local receiving device did not correctly receive the multicast transmission, sending a retransmission of the multicast transmission from the source device directly to the local receiving device.

26 Claims, 10 Drawing Sheets

(56) References Cited

OTHER PUBLICATIONS

3rd Generation Partnership Project; Technical Specification Group Radio Access Network; Evolved Universal Terrestrial Radio Access Network (E-UTRAN); Overall Description; Stage 2 (Release 8), 3GPP TS 36.300, V8.8.0 (Mar. 2009), 157 pages.

3rd Generation Partnership Project; Technical Specification Group Radio Access Network; Evolved Universal Terrestrial Radio Access Network (E-UTRA) and Evolved Universal Terrestrial Access Network (E-UTRAN); Overall Description; Stage 2 (Release 9), 3GPP TS 36.300, V9.1.0 (Sep. 2009), 165 pages.

"Multicast", http://en.wikipedia.org/wiki/Multicast, Accessed Dec. 2, 2009, 5 pages.

"Multimedia Broadcast Multicast Service", http://en.wikipedia.org/wiki/Multimedia_Broadcast_Multicast_Service, Accessed Nov. 29, 2009, 5 pages.

* cited by examiner

MULTICAST TRANSMISSION WITHIN A HYBRID DIRECT AND CELLULAR COMMUNICATION SYSTEM

TECHNICAL FIELD

The exemplary and non-limiting embodiments of this invention relate generally to wireless communication systems, methods, devices and computer programs and, more specifically, relate to communications within a hybrid direct and cellular communication system.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
ACK (positive) acknowledgement
BS base station
BW bandwidth
CQI channel quality information
D2D device-to-device
DL downlink (eNB towards UE)
DRX discontinuous reception
DTX discontinuous transmission
eNB E-UTRAN Node B (evolved Node B)
EPC evolved packet core
E-UTRAN evolved UTRAN (LTE)
FDD frequency division duplex
FDMA frequency division multiple access
HARQ hybrid automatic repeat-request
HSPA high speed packet access
IEEE institute of electrical and electronics engineers
LTE long term evolution of UTRAN (E-UTRAN)
LTE-A LTE advanced
MAC medium access control (layer 2, L2)
MANET mobile ad hoc network
MBMS multimedia broadcast/multicast service (3GPP)
MCS modulation and coding scheme
MM/MME mobility management/mobility management entity
NACK negative acknowledgement
Node B base station
OFDMA orthogonal frequency division multiple access
O&M operations and maintenance
PDCP packet data convergence protocol
PHY physical (layer 1, L1)
QoS quality of service
Rel release
RLC radio link control
RNTI radio network temporary identity
RRC radio resource control
RRM radio resource management
S-GW serving gateway
SC-FDMA single carrier, frequency division multiple access
TDD time division duplex
UE user equipment, such as a mobile station, mobile node or mobile terminal
UL uplink (UE towards eNB)
UTRAN universal terrestrial radio access network
Wi-Fi WLAN based on the IEEE 802.11 standard
WLAN wireless local area network The specification of a communication system known as evolved UTRAN (E-UTRAN, also referred to as UTRAN-LTE or as E-UTRA) is currently nearing completion within the 3GPP. As specified the DL access technique is OFDMA, and the UL access technique is SC-FDMA.

One specification of interest is 3GPP TS 36.300, V8.8.0 (2009-04), "3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8)," incorporated by reference herein in its entirety. This system may be referred to for convenience as LTE Rel-8 (with also contains 3G HSPA and its improvements). In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.1.0 (2009-9).

FIG. 1A reproduces FIG. 4.1 of 3GPP TS 36.300 V8.8.0, and shows the overall architecture of the E-UTRAN system 2 (Rel-8). The E-UTRAN system 2 includes eNBs 3, providing the E-UTRAN user plane (PDCP/RLC/MAC/PHY) and control plane (RRC) protocol terminations towards the UE (not shown). The eNBs 3 are interconnected with each other by means of an X2 interface. The eNBs 3 are also connected by means of an S1 interface to an EPC, more specifically to a MME by means of a S1 MME interface and to a S-GW by means of a S1 interface (MME/S-GW 4). The S1 interface supports a many-to-many relationship between MMEs/S-GWs and eNBs.

The eNB hosts the following functions:
functions for RRM: RRC, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

Of particular interest herein are the further releases of 3GPP LTE (e.g., LTE Rel-10) targeted towards future IMT-A systems, referred to herein for convenience simply as LTE-Advanced (LTE-A). Reference in this regard may be made to 3GPP TR 36.913, V8.0.1 (2009-03), 3rd Generation Partnership Project; Technical Specification Group Radio Access Network; Requirements for Further Advancements for E-UTRA (LTE-Advanced) (Release 8), incorporated by reference herein in its entirety. A goal of LTE-A is to provide significantly enhanced services by means of higher data rates and lower latency with reduced cost. LTE-A is directed toward extending and optimizing the 3GPP LTE Rel. 8 radio access technologies to provide higher data rates at very low cost. LTE-A will most likely be part of LTE Rel. 10. LTE-A will be a more optimized radio system fulfilling the ITU-R requirements for IMT-Advanced while keeping the backward compatibility with LTE Rel 8.

As is specified in 3GPP TR 36.913, LTE-A should operate in spectrum allocations of different sizes, including wider spectrum allocations than those of Rel-8 LTE (e.g., up to 100 MHz) to achieve the peak data rate of 100 Mbit/s for high mobility and 1 Gbit/s for low mobility. It has been agreed that carrier aggregation is to be considered for LTE-A in order to support bandwidths larger than 20 MHz. Carrier aggregation, where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel-8.

A terminal may simultaneously receive one or multiple component carriers depending on its capabilities. A LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

FIG. 1B shows an example of the carrier aggregation, where M Rel-8 component carriers are combined together to form M×Rel-8 BW (e.g. 5×20 MHz=100 MHz given M=5). Rel-8 terminals receive/transmit on one component carrier, whereas LTE-A terminals may receive/transmit on multiple component carriers simultaneously to achieve higher (wider) bandwidths.

MBMS includes two components: broadcast and multicast. Both portions refer to types of point-to-multipoint communication. Broadcasting is a unidirectional communication to an unknown set of receivers (i.e., the transmitting device does not need to track or maintain records regarding the receiving devices). Multicasting is a communication to a particular group of receiving devices (e.g., devices subscribed to the multicast, devices subscribed to a multicast group address). Generally, multicasting uses an efficient strategy whereby copies of the multicast transmission are created only when links to the multiple subscribers diverge. For purposes of convenience, the transmitting device of a point-to-multipoint communication (e.g., multicast, broadcast, MBMS) will be referred to as a sender or source (e.g., sender/source, source device).

As currently under consideration LTE-A may include D2D communication integrated with the cellular network. This integration would mean that the devices (e.g., UEs) could communicate via a direct (physical) communication link (e.g., using radio resources of the cellular network). As a non-limiting example, the cellular network may operate in FDD mode while the D2D connections utilize a TDD mode with cellular network UL, DL or UL and DL resources (controlled by the eNBs). Reference in regard to an integrated network having D2D and cellular communications generally may be made to PCT Publication No. WO 2005/060182 and U.S. Pat. No. 7,308,266.

The integration of D2D communications with a cellular network can be utilized to provide various improvements over conventional systems.

SUMMARY

The below summary section is intended to be merely exemplary and non-limiting.

The foregoing and other problems are overcome, and other advantages are realized, by the use of the exemplary embodiments of this invention.

In one exemplary embodiment of the invention, a method comprising: sending a multicast transmission from a source device to a base station in a wireless communication system, where the multicast transmission is for a plurality of receiving devices including a local receiving device, where the source device and the local receiving device are members of a local cluster that is at least partially located in a cell serviced by the base station; receiving, by the source device, a transmission of feedback information as it is transmitted from the local receiving device to the base station; and in response to the source device determining that the feedback information comprises an indication that the local receiving device did not correctly receive the multicast transmission, sending a retransmission of the multicast transmission from the source device directly to the local receiving device.

In another exemplary embodiment of the invention, an apparatus comprising: at least one processor; and at least one memory including computer program code, the at least one memory and the computer program code being configured to, with the at least one processor, cause the apparatus at least to perform: send a multicast transmission to a base station in a wireless communication system, where the multicast transmission is for a plurality of receiving devices including a local receiving device, where the source device and the local receiving device are members of a local cluster that is at least partially located in a cell serviced by the base station; receive a transmission of feedback information as it is transmitted from the local receiving device to the base station; and in response to determining that the feedback information comprises an indication that the local receiving device did not correctly receive the multicast transmission, send a retransmission of the multicast transmission directly to the local receiving device.

In a further exemplary embodiment of the invention, a method comprising: receiving, by a local receiving device, a multicast transmission as it is transmitted from a source device to a base station in a wireless communication system, where the multicast transmission is for a plurality of receiving devices including the local receiving device, where the local receiving device and the source device are members of a local cluster that is at least partially located in a cell serviced by the base station; and in response to the local receiving device incorrectly receiving the multicast transmission and further in response to the local receiving device determining that a first communication link is preferred over a second communication link, sending negative feedback information from the local receiving device to the base station, where the negative feedback information comprises an indication that the local receiving device incorrectly received the multicast transmission, where the first communication link is between the local receiving device and the source device and where the second communication link is between the local receiving device and the base station.

In another exemplary embodiment of the invention, an apparatus comprising: at least one processor; and at least one memory including computer program code, the at least one memory and the computer program code being configured to, with the at least one processor, cause the apparatus at least to perform: receive a multicast transmission as it is transmitted from a source device to a base station in a wireless communication system, where the multicast transmission is for a plurality of receiving devices including the apparatus, where the apparatus and the source device are members of a local cluster that is at least partially located in a cell serviced by the base station; and in response to incorrectly receiving the multicast transmission and further in response to determining that a first communication link is preferred over a second communication link, send negative feedback information to the base station, where the negative feedback information comprises an indication that the multicast transmission was incorrectly received, where the first communication link is between the apparatus and the source device and where the second communication link is between the apparatus and the base station.

In a further exemplary embodiment of the invention, a method comprising: receiving, by a base station, a multicast transmission from a source device in a wireless communication system, where the multicast transmission is for a plurality of receiving devices including a local receiving device, where the source device and the local receiving device are located in a cell serviced by the base station; and in response to the base station not receiving any feedback information from the local receiving device, sending a retransmission of the multicast transmission from the base station to the local receiving device.

In another exemplary embodiment of the invention, an apparatus comprising: at least one processor; and at least one memory including computer program code, the at least one memory and the computer program code being configured to, with the at least one processor, cause the apparatus at least to perform: receive a multicast transmission from a source device in a wireless communication system, where the multicast transmission is for a plurality of receiving devices including a local receiving device, where the source device and the local receiving device are located in a cell serviced by the apparatus; and in response to not receiving any feedback information from the local receiving device, send a retransmission of the multicast transmission to the local receiving device.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

The current solution for multicasting to multiple users in a cellular network, MBMS, does not include support for local and direct communication (D2D). Furthermore, another prior art technique for local communication, MANETs, includes support for multicasting but has high signaling overhead and does not exploit the benefits of the network's infrastructure. Based on the above, it would be desirable to provide improvements in multicasting that take advantage of the network architecture and utilize D2D communications to improve efficiency and service.

The exemplary embodiments of the invention provide novel solutions for multicast transmissions for one or more of the following cases: receivers in the same control cluster (local cluster) as the sender/source; receivers in the same cell as the sender/source; and/or receivers in a different cell from the sender/source. In at least some exemplary embodiments of the invention, at least one (i.e., at least some) of the receivers can be reached via D2D communications from the sender/source. The exemplary embodiments of the invention provide more efficient multicast transmissions that are able to exploit the benefits of the network's infrastructure and architecture (e.g., by using both D2D and cellular communications).

Figure 1A:
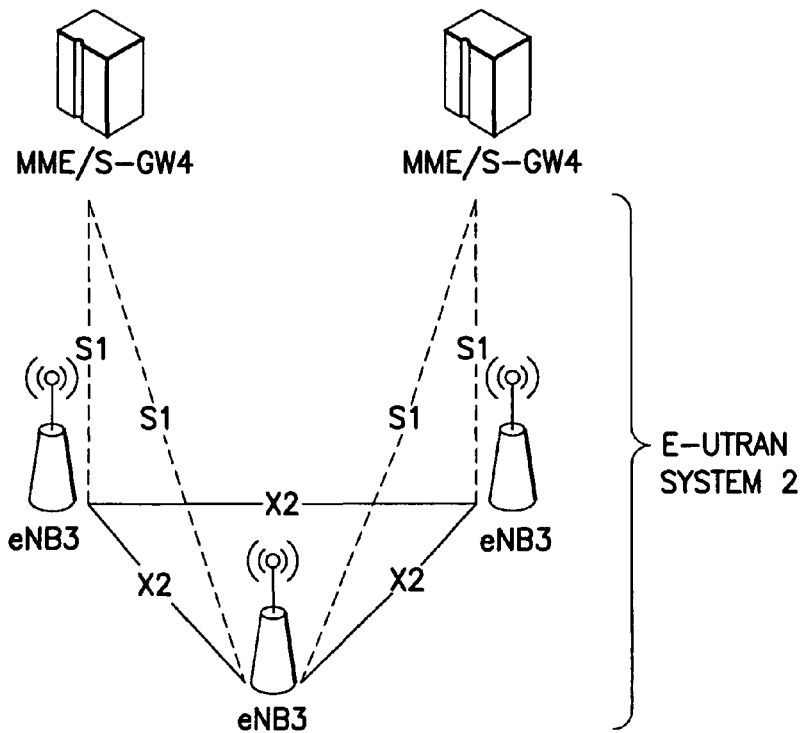
FIG. 1A reproduces FIG. 4 of 3GPP TS 36.300 V8.8.0, and shows the overall architecture of the E-UTRAN system.
Figure 1B:
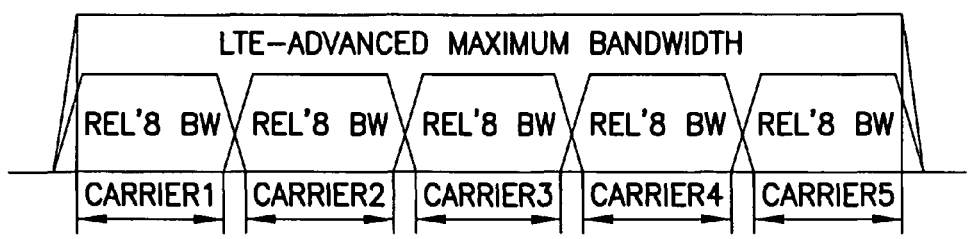
FIG. 1B shows an example of carrier aggregation as proposed for the LTE-A system.
Figure 2A:
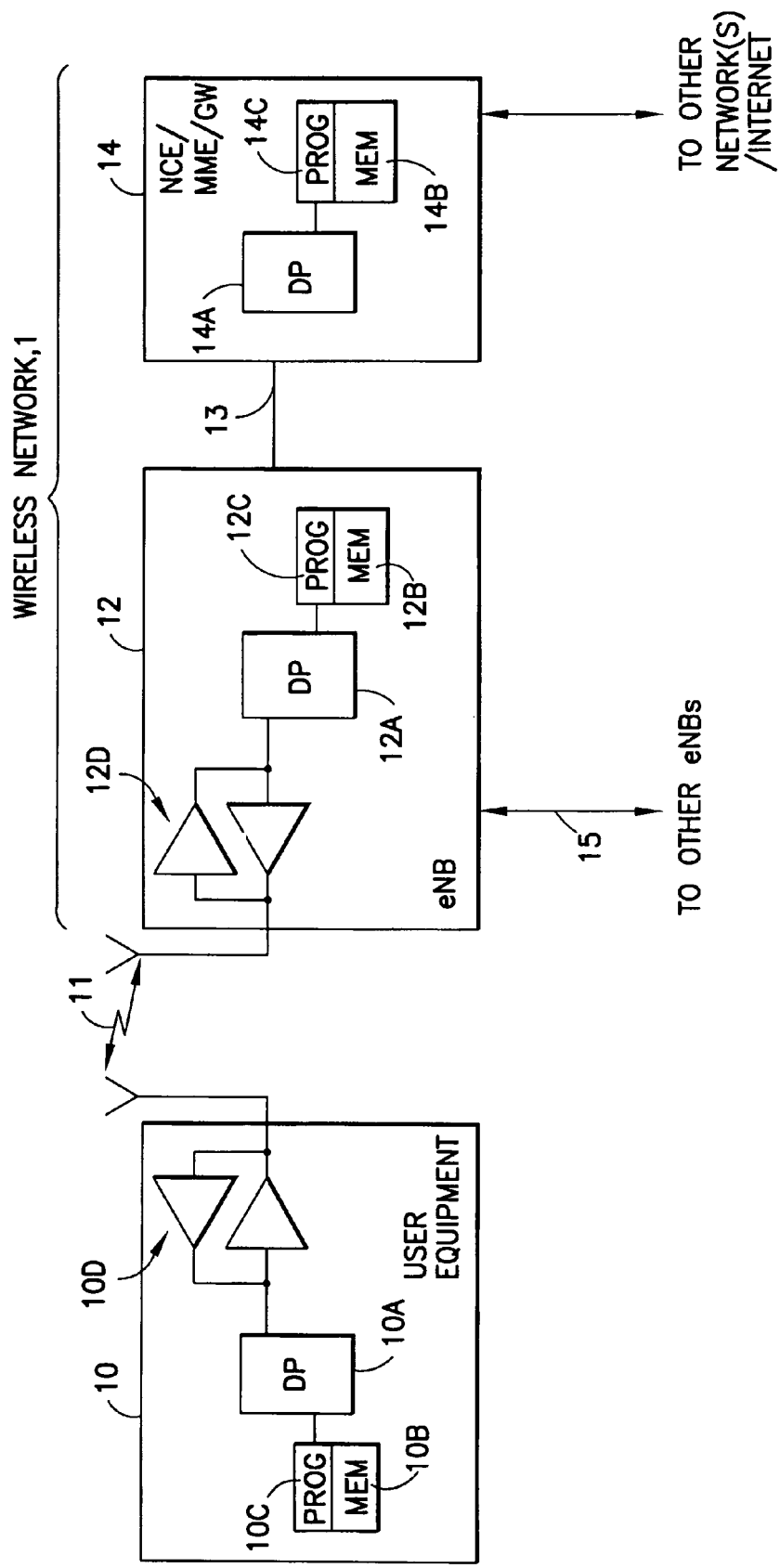
FIG. 2A shows a simplified block diagram of various exemplary electronic devices that are suitable for use in practicing the exemplary embodiments of this invention.

Before describing in further detail the exemplary embodiments of this invention, reference is made to FIG. 2A for illustrating a simplified block diagram of various exemplary electronic devices and apparatus that are suitable for use in practicing the exemplary embodiments of this invention. In FIG. 2A, a wireless network 1 is adapted for communication over a wireless link 11 with an apparatus, such as a mobile communication device which may be referred to as a user equipment (UE) 10, via a network access node, such as a Node B (base station), and more specifically an eNB 12. The network 1 may include a network control element (NCE) 14 that may include the MME/S-GW functionality shown in FIG. 1, and which provides connectivity with one or more other networks, such as a telephone network and/or a data communications network (e.g., the Internet). The UE 10 includes a controller, such as a computer, processor or data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas.

The eNB 12 includes a controller, such as a computer, processor or data processor (DP) 12A, a computer-readable memory medium embodied as a memory (MEM) 12B that stores a program of computer instructions (PROG) 12C, and a suitable radio frequency (RF) transceiver 12D for communication with the UE 10 via one or more antennas. The eNB 12 is coupled via a data/control path 13 to the NCE 14. As a non-limiting example, the path 13 may be implemented as the S1 interface shown in FIG. 1.

The NCE 14 includes a controller, such as a computer, processor or data processor (DP) 14A and a computer-readable memory medium embodied as a memory (MEM) 14B that stores a program of computer instructions (PROG) 14C. As noted above, the NCE 14 is coupled via a data/control path 13 to the eNB 12. The eNB 12 may also be coupled to one or more other eNBs via data/control path 15, which may be implemented as the X2 interface shown in FIG. 1, for example.

At least one of the PROGs 10C and 12C is assumed to include program instructions that, when executed by the associated DP 10A, 12A, enable the respective device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

It should be noted that while shown in FIG. 2A as having one communications component (transceiver 10D), in other exemplary embodiments the UE10 may include one or more additional communications components (e.g., additional and/or different transceivers). As a non-limiting example, the UE 10 may be configured to communicate with other UEs via a D2D communication link. As further non-limiting examples, such a D2D communication link may utilize wireless network resources (e.g., cellular resources) or different resources (e.g., ones for Bluetooth® or Wi-Fi).

In general, the various embodiments of the UE 10 can include, but are not limited to, mobile nodes, mobile stations, mobile phones, cellular phones, personal digital assistants (PDAs) having wireless communication capabilities, mobile routers, relay stations, relay nodes, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

Figure 2B:
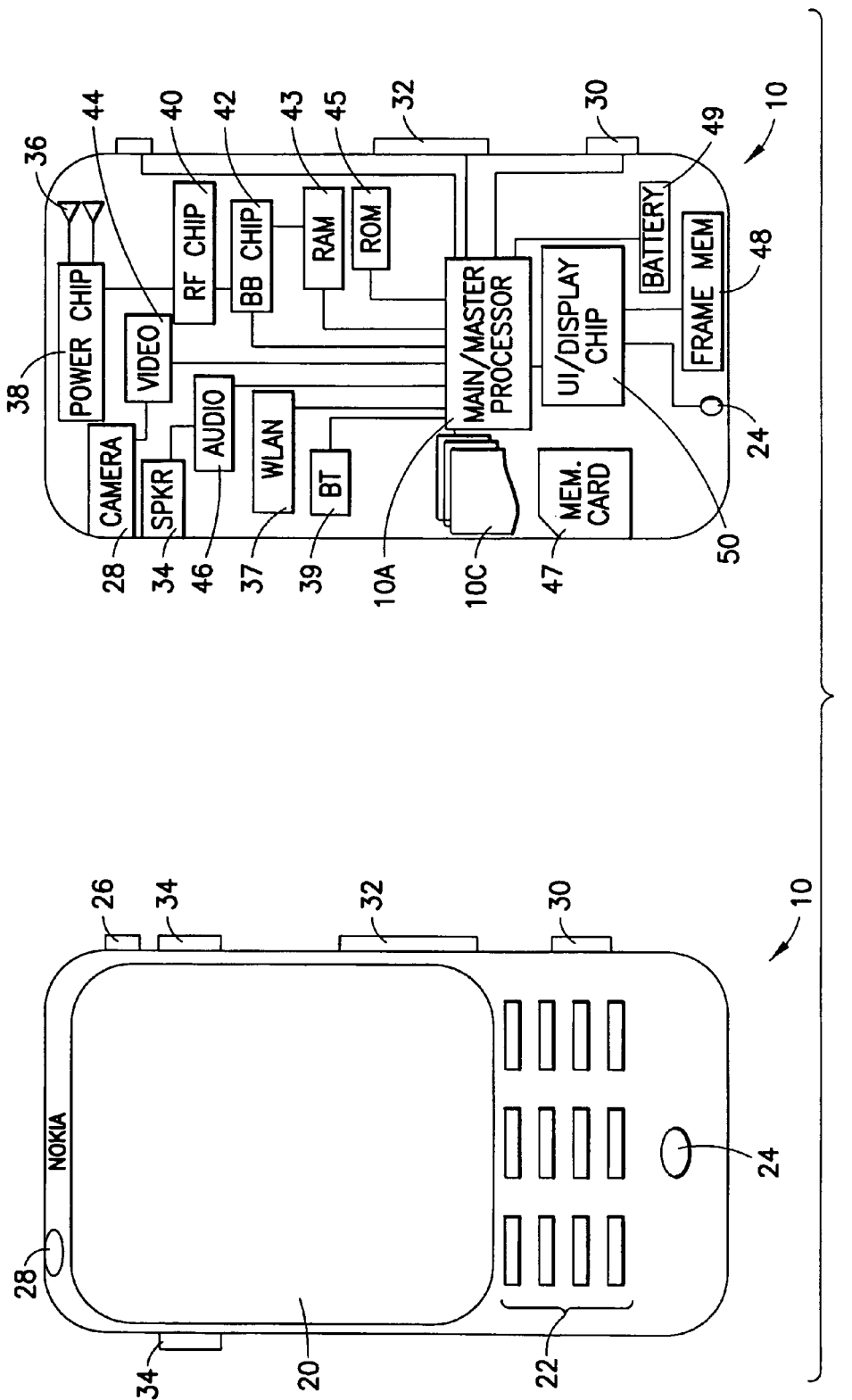
FIG. 2B shows a more particularized block diagram of an exemplary user equipment such as that shown in FIG. 2A.

FIG. 2B illustrates further detail of an exemplary UE 10 in both plan view (left) and sectional view (right). Exemplary embodiments of the invention may be embodied in one or more combinations that include one or more function-specific components, such as those shown in FIG. 2B. As shown in FIG. 2B, the UE 10 includes a graphical display interface 20, a user interface 22 comprising a keypad, a microphone 24 and speaker(s) 34. In further exemplary embodiments, the UE 10 may also encompass touch-screen technology at the graphical display interface 20 and/or voice-recognition technology for audio signals received at the microphone 24. A power actuator 26 controls the UE 10 being turned on and/or off by the user. The UE 10 may include a camera 28, which is shown as forward facing (e.g., for video calls) but may alternatively or additionally be rearward facing (e.g., for capturing images and video for local storage). The camera 28 may be controlled by a shutter actuator 30 and optionally by a zoom actuator 30, which may alternatively function as a volume adjustment for the speaker(s) 34 when the camera 28 is not in an active mode.

Within the sectional view of FIG. 2B are seen multiple transmit/receive antennas 36 that are typically used for wireless communication (e.g., cellular communication). The antennas 36 may be multi-band for use with other radios in the UE. The operable ground plane for the antennas 36 is shown by shading as spanning the entire space enclosed by the UE housing, though in some embodiments the ground plane may be limited to a smaller area, such as disposed on a printed wiring board on which a power chip 38 is formed. The power chip 38 controls power amplification on the channels being transmitted on and/or across the antennas that transmit simultaneously, where spatial diversity is used, and amplifies received signals. The power chip 38 outputs the amplified received signal to the radio frequency (RF) chip 40, which demodulates and downconverts the signal for baseband processing. The baseband (BB) chip 42 detects the signal, which is then converted to a bit-stream and finally decoded. Similar processing occurs in reverse for signals generated in the UE 10 and transmitted from it.

Signals to and from the camera 28 pass through an image/video processor (video) 44, which encodes and decodes the image data (e.g., image frames). A separate audio processor 46 may also be present to control signals to and from the speakers (spkr) 34 and the microphone 24. The graphical display interface 20 is refreshed from a frame memory (frame mem) 48 as controlled by a user interface/display chip 50, which may process signals to and from the display interface 20 and/or additionally process user inputs from the keypad 22 and elsewhere.

Certain exemplary embodiments of the UE 10 may also include one or more secondary radios such as a wireless local area network radio (WLAN) 37 and/or a Bluetooth® radio (BT) 39, which may incorporate one or more on-chip antennas or be coupled to one or more off-chip antennas. Throughout the UE 10 are various memories, such as a random access memory (RAM) 43, a read only memory (ROM) 45, and, in some exemplary embodiments, a removable memory such as the illustrated memory card 47. In some exemplary embodiments, the various programs 10C are stored on the memory card 47. The components within the UE 10 may be powered by a portable power supply such as a battery 49.

The aforesaid processors 38, 40, 42, 44, 46, 50, if embodied as separate entities in the UE 10 or the eNB 12, may operate in a master-slave relationship with respect to the main/master processor 10A, 12A. Exemplary embodiments of this invention need not be disposed in a central location, but may instead be disposed across various chips and memories as shown or disposed within another processor that combines some of the functions described above for FIG. 2B. Any or all of these various processors of FIG. 2B may access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which, in some exemplary embodiments, may include an array of tower-mounted antennas rather than the antennas 36 shown in FIG. 2B.

Note that the various processors and/or chips (e.g., 38, 40, 42, etc.) described above may be combined into a fewer number of such processors and/or chips and, in a most compact case, may be embodied physically within a single processor or chip.

While described above in reference to memories, these components may generally be seen to correspond to one or more storage devices, storage circuits, storage components and/or storage blocks. In some exemplary embodiments, these components may comprise one or more computer-readable mediums, one or more computer-readable memories and/or one or more program storage devices.

While described above in reference to processors, these components may generally be seen to correspond to one or more processors, data processors, processing devices, processing components, processing blocks, circuits, circuit devices, circuit components, circuit blocks, integrated circuits and/or chips (e.g., chips comprising one or more circuits or integrated circuits).

Figure 3:
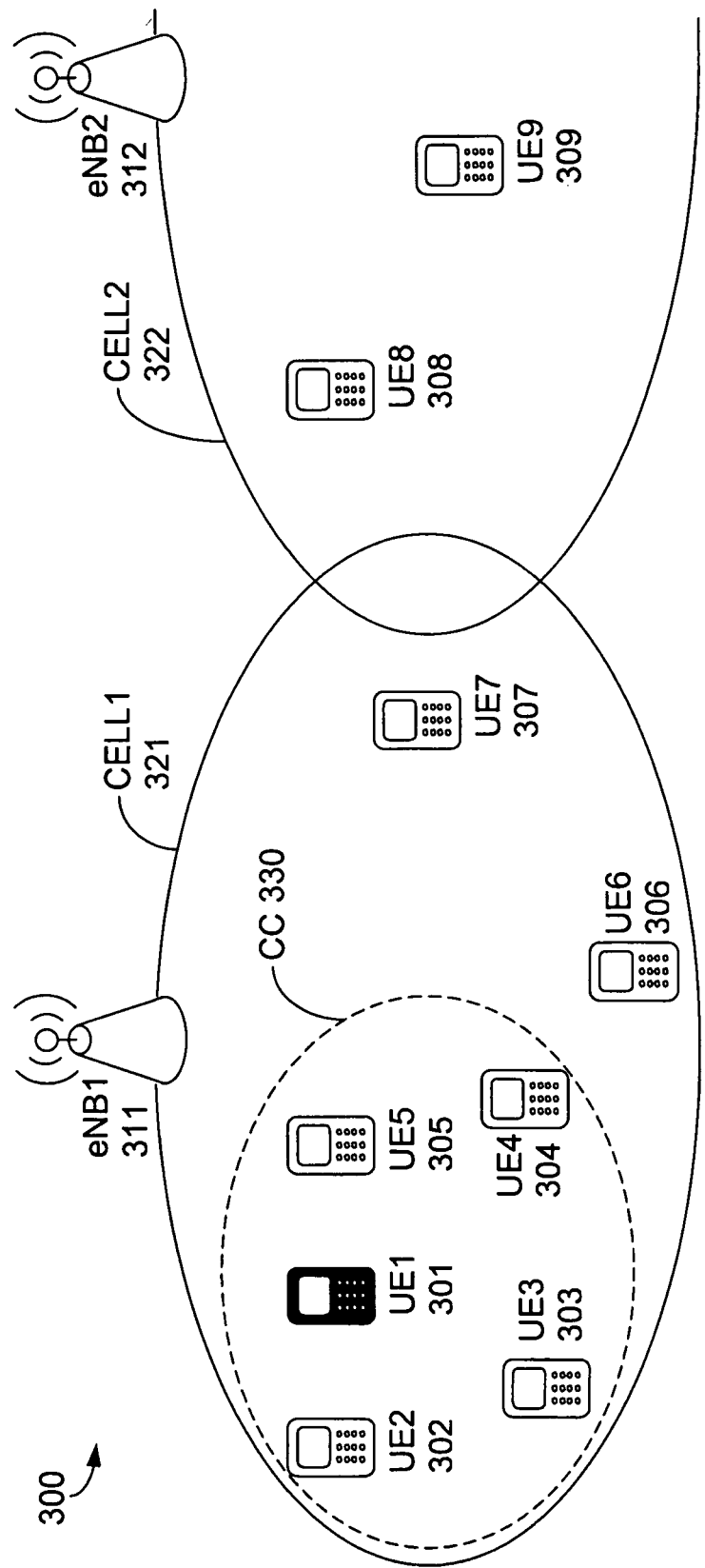
FIG. 3 shows an exemplary wireless communications network 300 within which the exemplary embodiments of the invention may be practiced.

FIG. 3 shows an exemplary wireless communications network 300 within which the exemplary embodiments of the invention may be practiced. The network 300 includes a number of UEs (301-309) that are currently located within one of two cells (cell1 321 and cell2 322). Each cell is overseen and serviced by a different eNB (eNB1 311 and eNB2 312, respectively). Some of the UEs (301-305) are configured for direct communication in the cluster mode and, as such, are located within a control cluster (CC) 330 (also referred to as a local cluster). The CC 330 can be distinguished from a service cluster which relates to those UEs participating in (e.g., receiving, communicating with/using) a same service or communication mode (e.g., multicast, broadcast, MBMS). The UEs (301-305) in the CC 330 may be able to communicate with one another directly (D2D).

As a non-limiting example, consider the case where UE1 301 wishes to initiate a point-to-multipoint communication (e.g., a multicast communication) with other UEs (e.g., 302-309). Note that the receiving UEs (i.e., those UEs to which the source 301 will send the point-to-multipoint communication) can be classified into three different groups: (i) UEs in the same local cluster as the source 301 (e.g., UEs2-5 302-305); (ii) UEs in the same cell as the source 301 but not in the same local cluster as the source 301 (e.g., UE6 306 and UE7 307); and (iii) UEs in a different cell from the source 301 (e.g., UE8 308 and UE9 309). Group (iii) will require the source 301 to transmit the data to the eNB (e.g., eNB1 311) so that the communication can be routed to the UEs (e.g., UE8 308 and UE9 309) by the eNBs (e.g., eNB1 311 and eNB2 312) via the wireless network.

The sender/source, UE1 301, will send the same information to the local cluster members (UEs 302-304) and to the network (to the eNB1 311). Note that the cellular transmission has to be made for the first transmission regardless and it is likely that the local cluster members will be able to receive the cellular transmission (the transmission from UE1 301 to eNB1 311), for example, due to the higher power which is used for transmissions to the eNB1 311 (e.g., higher power than for D2D transmissions). As such, it would be beneficial (e.g., more efficient) to make only one transmission instead of numerous transmissions (e.g., instead of a D2D communication for each of the receiving devices in the local cluster). The exemplary embodiments of the invention describe techniques for arranging this point-to-multipoint transmission with efficient feedback.

FIGS. 4-7 illustrate one non-limiting example of a point-to-multipoint communication in accordance with the exemplary embodiments of the invention. FIGS. 4-7 show the exemplary wireless communications network 300 with seven UEs (301-307) that are located within a cell (Cell 1 321) that is managed/serviced by a base station (eNB1 311). Some of the UEs (301-305) are members of the control cluster (CC) 330. One of the UEs (UE1 301) is the source/sender for a multicast transmission 401 that is sent to the other UEs (302-307).

Figure 4:
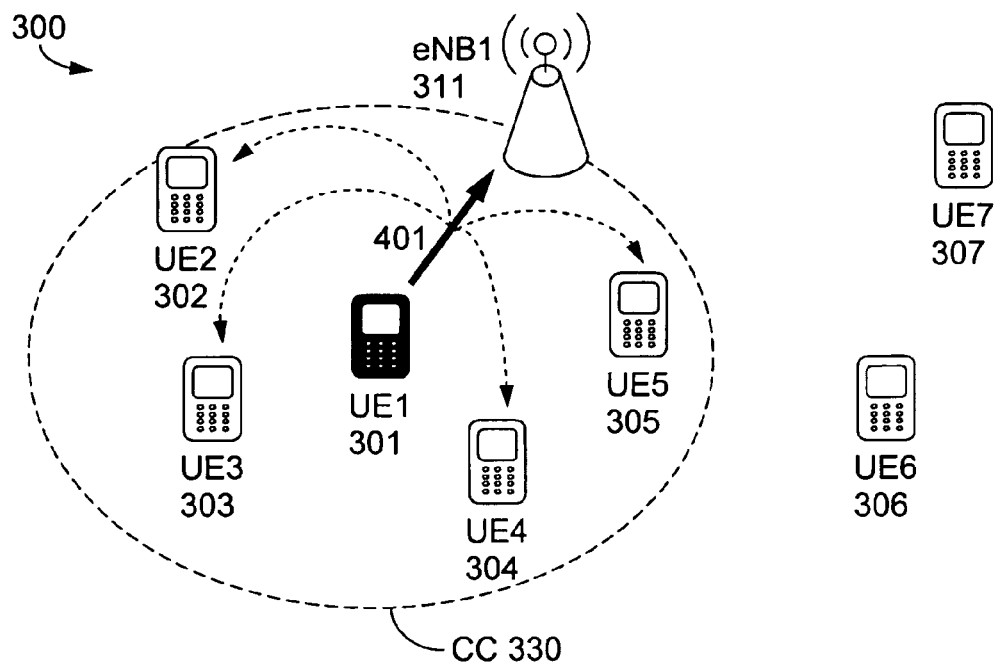
FIG. 4 illustrates a source sending an exemplary multicast transmission to a base station in accordance with the exemplary embodiments of the invention.

In FIG. 4, the source (UE1 301) sends a multicast communication 401 to the eNB1 311. Since this transmission is sent to the eNB1 311, it is sent at a sufficiently high power (e.g., cellular UL transmission power) to ensure that the eNB1 311 is able to receive the communication. As a non-limiting example, the multicast communication 401 may be transmitted with a cluster RNTI that corresponds to the CC 330. In such a manner, the other CC 330 members (e.g., UEs2-5 302-305) can listen (receive) the transmission 401 using the cluster RNTI. This may be useful as initially the source 301 may not be aware of the exact locations of the receivers (i.e., the source 301 may not be sure which cluster members are reachable via direct communication).

At least three outcomes are possible for the multicast transmission: (1) the UE receives the multicast transmission correctly; (2) the UE incorrectly receives the multicast transmission (e.g., an error occurs); or (3) the UE is unable to receive the transmission (e.g., the UE is too far from the source 301 for D2D communication, the UE is unaware of the multicast transmission, the UE is in DTX/DRX).

In response to receiving the multicast transmission (correctly or incorrectly), the UEs may send an ACK/NACK to the base station (e.g., eNB, Node B, access point). If the UE (receiver) receives the packet correctly, the UE sends an ACK, at the cellular UL power, to the eNB1 311. The source (UE1 301) may or may not receive the ACK. This is not a significant issue since the source 301 is primarily concerned with NACKs and not ACKs.

If the packet is incorrectly received, the UE (receiver) can check for the following in order to determine how to respond. If the eNB-receiver link is worse than the source-receiver link (e.g., +offset), the receiver sends a NACK to the eNB. The source (UE1 301) will receive the NACK and act on it. If the eNB-receiver link is better than the source-receiver link (e.g., +offset), the receiver would be in DTX and no feedback information (e.g., ACK/NACK) is transmitted.

In summary, if the receiver would prefer to receive a re-transmission (Re-TX) from the source 301 (e.g., via D2D communication), for example, because the source-receiver link is better than the eNB-receiver link, the receiver sends a NACK to the eNB1 311 and expects the source 301 to also receive the NACK (e.g., so the source 301 knows to send a Re-TX to the receiver). If the receiver would prefer to receive a Re-TX from the eNB1 311 (e.g., via the DL), for example, because the eNB-receiver link is better than the source-receiver link, the receiver does not send a NACK (or an ACK) to the eNB1 311 (e.g., the receiver remains in DTX) since the eNB1 311 will send a Re-TX to any UE that fails to send an ACK/NACK.

If the receiver fails to receive the multicast transmission at all, the receiver would remain in DTX. In some cases, the receiver may not be aware of the multicast transmission and, thus, would not know to send an ACK/NACK.

Figure 5:
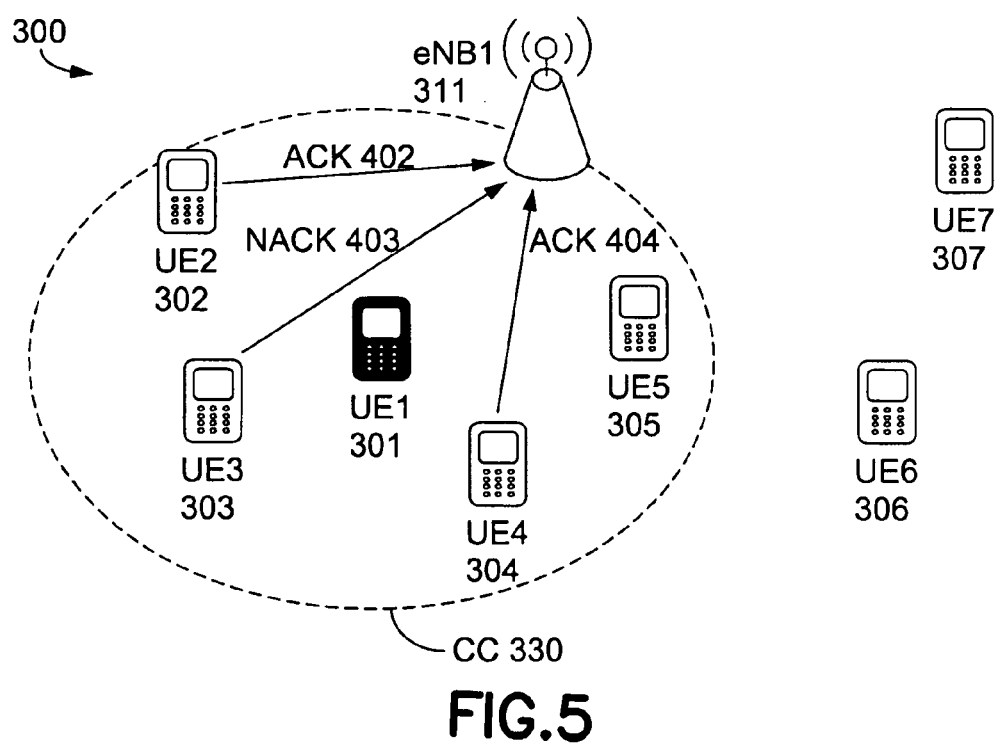
FIG. 5 depicts exemplary feedback transmissions sent by the receivers in response to receiving the exemplary multicast transmission of FIG. 4.

This is shown in FIG. 5 wherein UE2 302 and UE4 304 send an ACK 402, 404 to the eNB1 311 while UE3 303 sends a NACK 403. Note that UE5 305 received the multicast transmission incorrectly and, even though it is in the CC 330, did not send a NACK to the eNB1 311. This functionality is as explained above—the UE5 would prefer to receive a Re-TX from the eNB1 311 and not from the source. Also note that UE6 306 and UE7 307 failed to send an ACK or NACK to the eNB1 311 since neither of these UEs received the multicast transmission (e.g., the UEs were too far from the source 301 for D2D communication). The source (UE1 301) can listen for the ACK/NACKs from the UEs since the ACK/NACKs will be sent at the cellular UL power, similar to the multicast transmission 401.

According to the initial feedback information (e.g., the ACK/NACKs or DTX), both the eNB1 311 and the source (UE1 301) can determine information regarding the cluster topology. Based on this information, the eNB1 311 and the source 301 further can determine which receivers are waiting for or are due a retransmission from the respective device (i.e., the eNB1 311 or the source).

For example, the eNB1 311 can categorize the users into at least two groups based on the feedback information and cluster member list in the service registration table:

1. D2D-reachable receivers (those receivers that sent an ACK or NACK); and
2. The remaining users (D2D unreachable users or users with better cellular links; those receivers in DTX).

For the D2D-reachable receivers, the eNB1 311 may dynamically allocate resources to the sender for Re-TX. As an alternative, (semi-)persistent scheduling may be used and the source 301 may perform the Re-TX using the previously allocated resources. The remaining users will be handled by the eNB1 311. That is, the eNB1 311 will scheduled resources for Re-TX to the remaining users. In both cases, the Re-TX may be any suitable communication or transmission, such as unicast, multicast or broadcast, as non-limiting examples. As a further non-limiting example, the type of communication utilized may depend on the channel qualities (e.g., reported CQI information).

Based on the ACK/NACKs shown in FIG. 5 and described above, the source 301 need only take care of UE3 303 which sent a NACK 403 to the eNB1 311. The other "unreachable" receivers, namely UE5 305, UE6 306 and UE7 307, will be handled by the eNB1 311.

Figure 6:
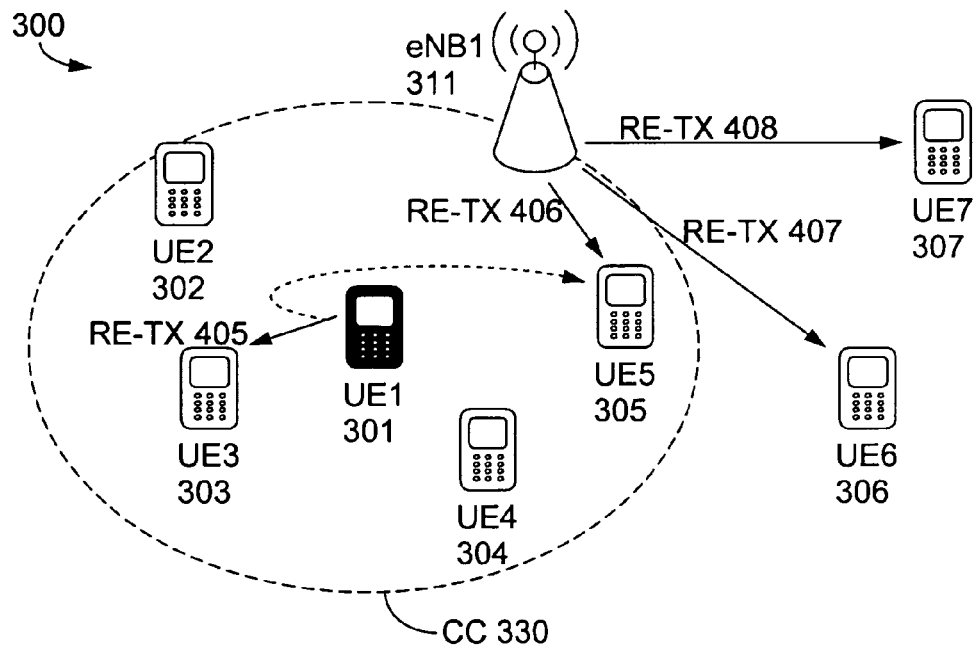
FIG. 6 shows exemplary retransmissions sent by the source and the base station based on the exemplary feedback transmissions of FIG. 5.

FIG. 6 shows the Re-TX that are sent by the source (UE1 301) and eNB1 311. The source 301 sends a D2D communication (Re-TX 405) to the UE3 303. The eNB1 311 sends Re-TXs to UE5 305 (Re-TX 406), UE6 306 (Re-TX 407) and UE7 307 (Re-TX 408). Since UE4 304 is within the CC 330, UE4 304 also may listen to the Re-TX 405 from the source 301 to UE3 303. Accordingly, it is possible for UE4 304 to have both micro diversity gain (due to soft combining with the previously received packet from the source) and macro diversity gain (due to the packet selection, assuming the eNB1 311 adopts a different MCS than the multicast transmission 401 from the source). Note that the source 301 does not need to send the Re-TX 405 to the UE4 304 intentionally with a higher power since the eNB1 311 will take care of it by sending the Re-TX 406 to the UE4 304.

Figure 7:
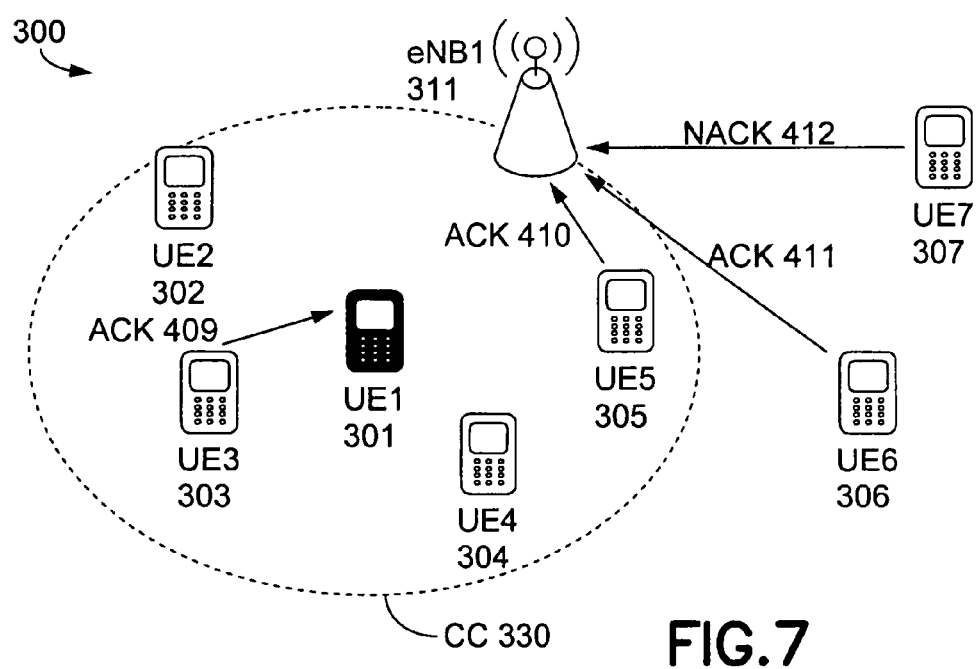
FIG. 7 depicts further exemplary feedback information that is sent in response to the receivers receiving the exemplary retransmissions of FIG. 6.

FIG. 7 shows further feedback information (e.g., ACK/NACK) that is sent in response to the receivers receiving the Re-TXs. The difference for the Re-TX feedback as compared to the previous feedback (see FIG. 5) is that the D2D-reachable users can send the feedback to the source 301 with D2D link power (i.e., instead of cellular UL power). The remaining users (those unreachable by D2D communication) would send feedback to the eNB1 311 using cellular UL power. In some exemplary embodiments, from this point on the transmission/retransmission can be performed independently (separately) by the source 301 and the eNB1 311 since they each have knowledge regarding the cluster topology.

In FIG. 7, UE3 303 sends an ACK 409 to the source 301 using D2D communication and D2D link power. UE5 305, UE6 306 and UE7 307 each send an ACK 410, 411 or NACK 412 to the eNB1 311 using cellular UL power.

As non-limiting examples, the above-described exemplary procedure can be performed: dynamically (e.g., for each initial point-to-multipoint transmission) to follow the dynamic changes in cluster topology or the varying channel conditions (as non-limiting examples), periodically (e.g., assuming the cluster members are rather static, in order to save power), or on a conditional basis (e.g., triggered by an event or a command from the eNB).

With regards to the exemplary point-to-multipoint communication illustrated in FIGS. 4-7, it should be noted that the above discussion assumes that the source (UE1 301) was already allocated resources for its multicast transmission 401 to the eNB1 311 and, further, that some of the receiving UEs (e.g., receivers in the local cluster that are not in DTX/DRX) have been informed or are aware of the resources used for the multicast transmission 401.

In further exemplary embodiments of the invention, various steps may be performed prior to the initial multicast transmission 401. As a non-limiting example, the source (UE1 301) can check if there are distant members in the service cluster (i.e., members that can only be reached via the eNB1 311). This can be performed by checking IP routing information against the IP multicast address, for example. (The source 301 uses the group address as the IP destination address in the multicast transmission 401, while the receivers use the group address to inform the network that they are interested in receiving packets sent to the group.)

If there are distant members in the service cluster and the source 301 would like to transmit multicast data, there are at least three options that may be utilized:

(A) The source 301 can send a request to the eNB1 311 for cellular resources to send the multicast data to the eNB1 311. The other members (e.g., local members of the service cluster) can listen to the request and the response in order to know which resources are given (assigned, allocated) to the source 301. For example, the source 301 can request resources using the cluster RNTI. In such a manner, the other members can follow the resource allocation signaling by the base station for the cluster RNTI. When the base station grants resources for the source 301, the other members will be informed. Thus, when the source 301 transmits the multicast data 401 to the eNB1 311, the other members will be able to receive the multicast data 401, too.

(B) Similar to (A) above, the source 301 sends a request to the eNB1 311 and the other members listen to the request and/or response in order to know which resources are allocated to the source 301. In addition, at least one bit is used in the multicast transmission 401 in order to inform the other members in the cluster whether they should read the data 401 or ignore it. As a non-limiting example, the at least one bit may be in the radio level, such as in the PHY and/or MAC layers. As a further non-limiting example, the at least one bit may consist of only one bit. As another non-limiting example, the at least one bit may comprise a read flag configured to indicate to at least one receiver whether or not the receiver should read the message/transmission/data.

(C) The source 301 can send a request to the eNB1 311 for cellular resources to send the multicast data to the eNB1 311. Once the source 301 receives a response with the allocation, the source 301 informs the other members in the cluster about the resources, for example, via in-band signaling. Thus, when the source 301 transmits the multicast data 401 to the eNB1 311, the other members will be able to receive the multicast data 401, too.

Figure 8:
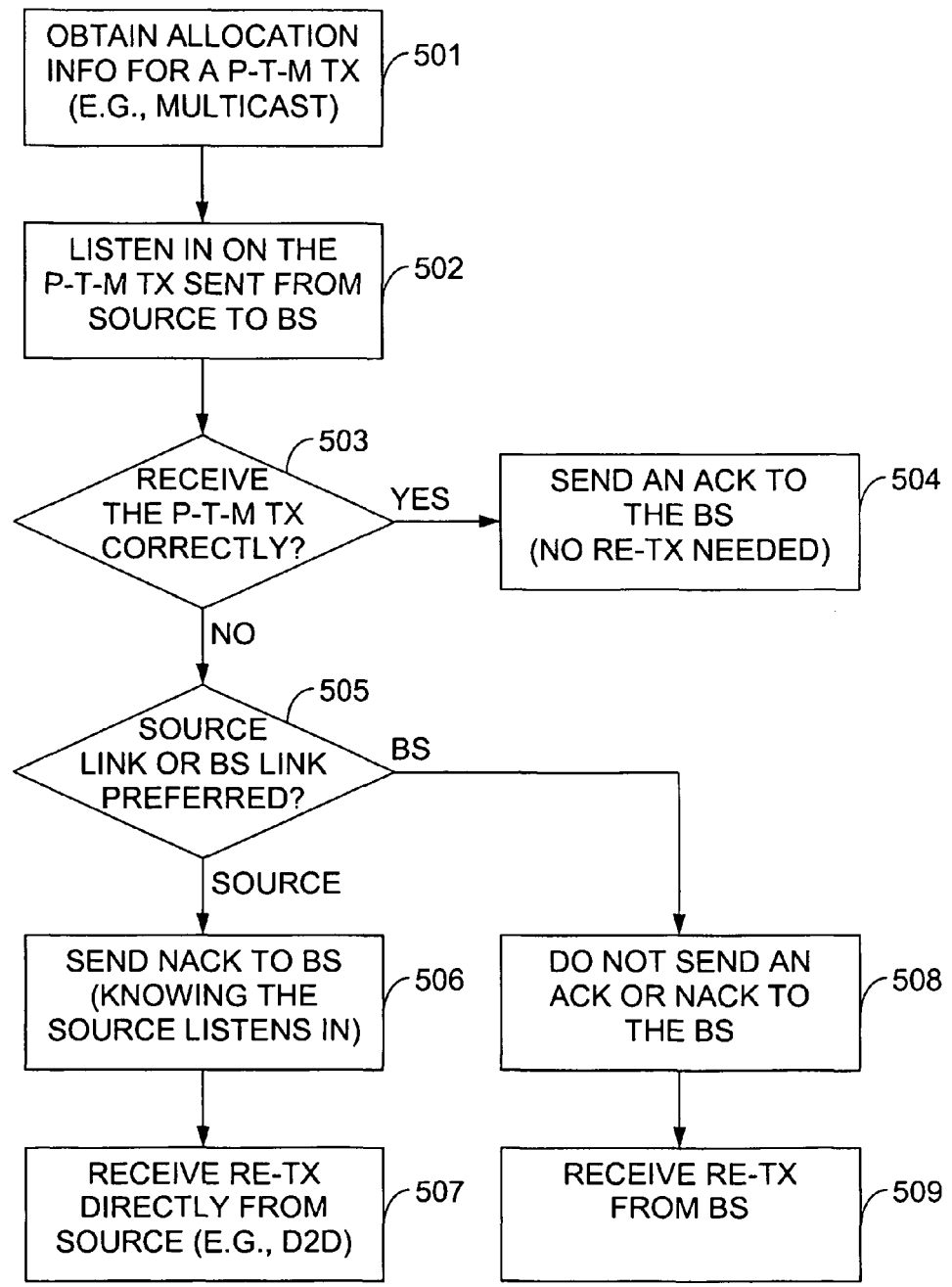
FIG. 8 is a logic flow diagram that illustrates the operation of an exemplary method, and a result of execution of computer program instructions embodied on a computer readable memory, in accordance with the exemplary embodiments of this invention.

FIG. 8 is a logic flow diagram that illustrates the operation of an exemplary method, and a result of execution of computer program instructions embodied on a computer readable memory, in accordance with the exemplary embodiments of this invention. The exemplary method of FIG. 8 may be performed by a local receiving device (LD), and is illustrative of the communications that may occur between the LD, a source device (source) and a base station (BS). Note that similar to the exemplary embodiments discussed above with respect to FIGS. 4-7, the source and the LD are members of a local cluster in a cell that is serviced (e.g., managed, overseen) by the BS (within a wireless communication system, such as one that supports cellular communication and D2D communication, such as LTE-A). As such, the LD and the source may communicate with one another using D2D communication.

The LD obtains allocation information for a point-to-multipoint (P-T-M) transmission (TX), such as a multicast transmission (501). The LD uses this allocation information to listen in on the P-T-M transmission that is sent from the source to the BS (502). Note that the LD does not need to receive the P-T-M transmission via the BS since the LD can listen in on it locally. In further exemplary embodiments, the LD may receive a copy of the P-T-M transmission via the BS (e.g., for combining gains). In other exemplary embodiments, the LD may receive the copy only if its connection (link) with the source is comparatively poor. In further exemplary embodiments, the transmission of the copy may be pre-established and/or requested by the LD.

The LD checks to see if it received the P-T-M transmission correctly (503). If the P-T-M transmission was received correctly (Yes), the LD sends an ACK to the BS and no retransmission (RE-TX or Re-TX) is needed (504). If the P-T-M transmission was received incorrectly or was not received correctly (No), the LD checks to see which link it prefers: the LD-source link or the LD-BS link (505). As non-limiting examples, this "preference" may be based on one or more of: CQI, channel measurements, past communications (e.g., success or failure of past communication), an automatically specified preference, a manually set preference, a prompt for the user, an instruction (e.g., a previous instructions or a previous command) from the BS, or an instruction (e.g., a previous instructions or a previous command) from the source, as non-limiting examples.

If the source link is preferred (source), the LD sends a NACK to the BS knowing that the source is listening to the ACK/NACKs sent from devices in the local cluster (506). That is, the LD knows that sending a NACK to the BS will provoke a retransmission directly from the source (e.g., via D2D). The LD then receives a retransmission directly from the source, for example, via D2D communication (507). If the BS link is preferred (BS), the LD does not send an ACK or a NACK to the BS (508). Instead, the LD sends no acknowledgement knowing that this will provoke a retransmission from the BS (e.g., via the LD-BS link). Thus, the LD receives the retransmission from the BS (509).

The above description regarding the method and techniques shown in FIG. 8 are equally applicable to the respective actions and operations that are performed by the source and the BS.

In at least some exemplary embodiments, the base station (e.g., eNB) should know, based on communication with servers or the MME, which UEs belong to the service cluster. Thus, the eNB can determine which UEs are under its control (e.g., capable of receiving a retransmission from the eNB) and how to route the packets to the remaining UEs (e.g., those that are currently located in other cells under other eNBs). If the eNB does not know this information, it may not be able to differentiate between D2D-unreachable UEs in the service cluster and other inactive UEs in the cell, both of which may be in DTX/DRX.

In at least some further exemplary embodiments, if the base station (e.g., eNB) does not correctly receive the first multicast transmission from the source, the source transmits the multicast transmission (packet) in HARQ mode until it is correctly received by the eNB. Prior to the correct reception, retransmissions would only be sent by the source. Further, even if multiple copies of the multicast transmission were received by the local receiving devices (e.g., by listening in on the HARQ transmissions) the higher layer(s) would delete the duplicate packets (e.g., by checking the packet transmission sequence number).

Note that the exemplary embodiments of the invention account for UE mobility, varying channel conditions and dynamic cluster topology. Even if the real-time measurement reports may assist in tracking cluster topology, using such reports would be time-consuming and inefficient due to high signaling overhead. In contrast, the exemplary embodiments of the invention ensure the QoS of the cluster using an efficient communication method.

The exemplary embodiments of the invention provide an efficient point-to-multipoint (e.g., multicast) communication scheme for communication with local and/or distant cluster members. The exemplary embodiments of the invention combine the benefits of local communication with the strength and distance of cellular communication using implicit mode selection. The exemplary embodiments of the invention also provide good options for cluster management in future cellular networks—devices can remain grouped when it is beneficial for them, and all of the members do not have to be locally reachable in order to efficiently communicate among members of a service cluster.

The exemplary hybrid cellular-direct transmission and feedback scheme provides a number of advantages, particularly when the service cluster differs from the control cluster (i.e., the sender cannot reach all of the members of the service cluster by direct transmission). With the exemplary hybrid transmission, the source 301 can concurrently transmit to the access node (e.g., eNB) and to the local receivers, thus saving power and resource (e.g., as compared with multiple transmissions). Distant service cluster members that cannot be reached via direct (D2D) transmission can receive the source's point-to-multipoint transmission via access point forwarding. The exemplary feedback scheme provides effective resource allocations for retransmissions to the service cluster members. The exemplary embodiments of the invention further enable effective communication between service cluster members since the control cluster (local cluster) can still exist and benefit from the locality and closeness of the devices while still maintaining a connection with more distant service cluster members. In addition, local transmissions are still handled locally (e.g., unicast to local cluster members) while the multicast communication for distant service cluster members is efficiently handled as described herein. In addition, usage of the exemplary embodiments of the invention mean that it is not necessary or required to form a control cluster (e.g., CC 330) beforehand since UEs that cannot receive the communication via a D2D link will be reached by the retransmission from the eNB. Thus, control cluster management is loosened (relaxed).

Below are provided further descriptions of various non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

Figure 9:
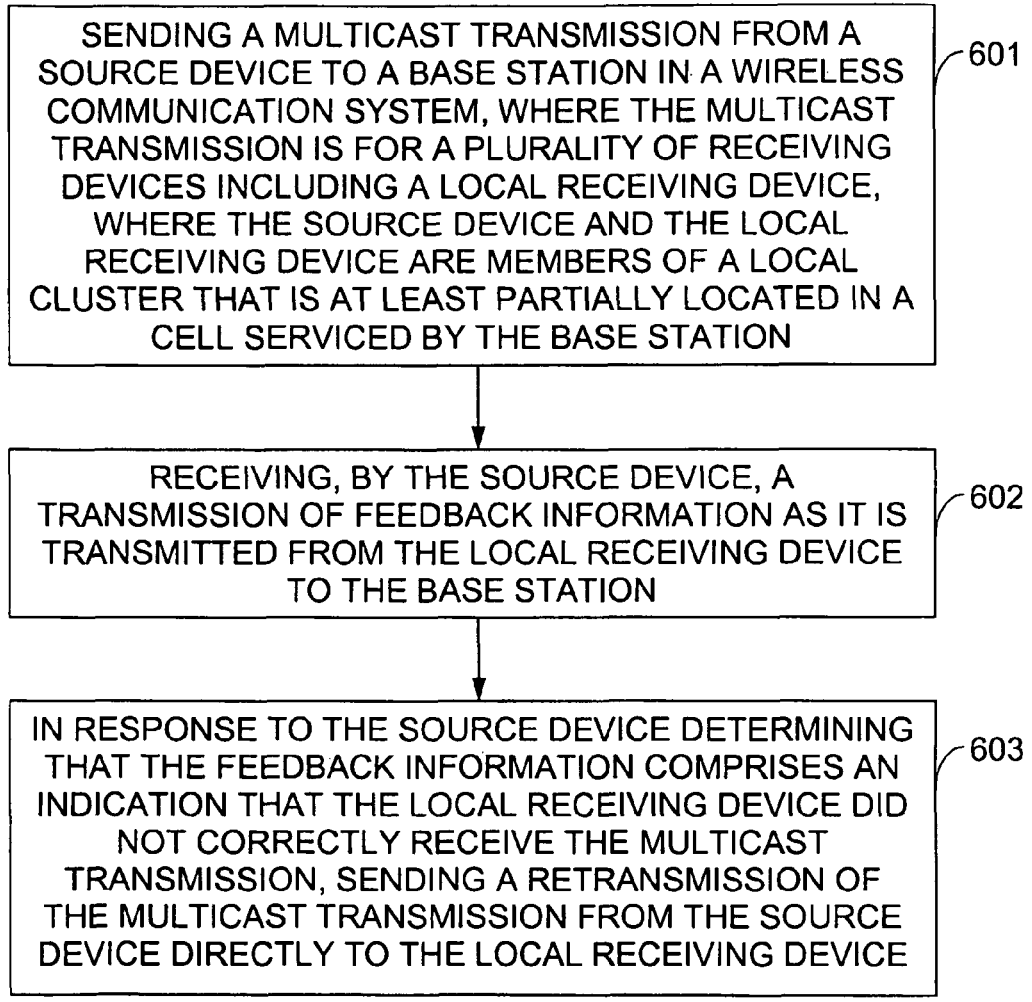
FIG. 9 is a logic flow diagram that illustrates the operation of another exemplary method, and a result of execution of computer program instructions embodied on a computer readable memory, in accordance with the exemplary embodiments of this invention.

(1) In one exemplary embodiment, and with reference to FIG. 9, a method comprising: sending a multicast transmission from a source device to a base station in a wireless communication system, where the multicast transmission is for a plurality of receiving devices including a local receiving device, where the source device and the local receiving device are members of a local cluster that is at least partially located in a cell serviced by the base station (601); receiving, by the source device, a transmission of feedback information as it is transmitted from the local receiving device to the base station (602); and in response to the source device determining that the feedback information comprises an indication that the local receiving device did not correctly receive the multicast transmission, sending a retransmission of the multicast transmission from the source device directly to the local receiving device (603).

A method as above, further comprising: sending a request for a resource allocation from the source device to the base station, where the requested resource allocation is for the multicast transmission; and receiving, by the source device, a response from the base station, where the response comprises the resource allocation. A method as in any above, where the retransmission comprises a device-to-device communication. A method as in any above, further comprising: receiving, by the source device, second feedback information from the local receiving device, where the second feedback information comprises an indication of whether the local receiving device correctly received the retransmission. A method as in any above, where the multicast transmission is sent from the source device to the base station in response to the source device determining that at least one of the plurality of receiving devices is located in a different cell that is serviced by a different base station.

A method as in any above, where the request for the resource allocation is sent using the local cluster RNTI. A method as in any above, further comprising: signaling the resource allocation to the local receiving device. A method as in any above, further comprising: signaling the resource allocation to the local receiving device using radio level in-band signaling. A method as in any above, where the feedback information comprises an ACK or a NACK. A method as in any above, where the feedback information is not received by the source device via the base station. A method as in any above, where the retransmission is not sent via the base station.

A method as in any above, where the multicast transmission is sent at a cellular uplink power. A method as in any above, where the retransmission is sent at a D2D power. A method as in any above, where the retransmission is sent at a D2D power that is less than a cellular uplink power. A method as in any above, where the feedback information is not addressed to the source device. A method as in any above, where the source device comprises at least one of a user equipment, a mobile station, a mobile device, a mobile node, a mobile computer, a mobile computing device and a personal digital assistant. A method as in any above, where the wireless communication system comprises an evolved universal terrestrial radio access network (E-UTRAN). A method as in any above, where the wireless communication system comprises a long term evolution of universal terrestrial radio access network (LTE). A method as in any above, where the wireless communication system comprises a long term evolution of universal terrestrial radio access network-advanced (LTE-A). A method as in any above, further comprising: in response to the base station not receiving any feedback information from another local receiving device, sending a retransmission of the multicast transmission from the base station to the other local receiving device.

A method as in any above, implemented as (e.g., performed by) a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A method as in any above, further comprising one or more aspects of the exemplary embodiments of the invention as described elsewhere herein, and, in particular, one or more aspects of the exemplary embodiments of the invention as relating to exemplary methods described herein.

(2) In another exemplary embodiment, a program storage device readable by a machine, tangibly embodying a program of instructions executable by the machine for performing operations, said operations comprising: sending a multicast transmission to a base station in a wireless communication system, where the multicast transmission is for a plurality of receiving devices including a local receiving device, where the machine and the local receiving device are members of a local cluster that is at least partially located in a cell serviced by the base station (601); receiving a transmission of feedback information as it is transmitted from the local receiving device to the base station (602); and in response to determining that the feedback information comprises an indication that the local receiving device did not correctly receive the multicast transmission, sending a retransmission of the multicast transmission directly to the local receiving device (603).

A program storage device as in any above, where the machine comprises at least one of a user equipment, a mobile station, a mobile device, a mobile node, a mobile computer, a mobile computing device, a personal digital assistant and a source device. A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described elsewhere herein, and, in particular, one or more aspects of the exemplary embodiments of the invention as relating to exemplary methods described herein.

(3) In another exemplary embodiment, an apparatus comprising: at least one processor; and at least one memory including computer program code, the at least one memory and the computer program code being configured to, with the at least one processor, cause the apparatus at least to perform: send a multicast transmission to a base station in a wireless communication system, where the multicast transmission is for a plurality of receiving devices including a local receiving device, where the source device and the local receiving device are members of a local cluster that is at least partially located in a cell serviced by the base station; receive a transmission of feedback information as it is transmitted from the local receiving device to the base station; and in response to determining that the feedback information comprises an indication that the local receiving device did not correctly receive the multicast transmission, send a retransmission of the multicast transmission directly to the local receiving device.

An apparatus as in any above, where the apparatus comprises at least one of a user equipment, a mobile station, a mobile device, a mobile node, a mobile computer, a mobile computing device, a personal digital assistant and a source device. An apparatus as in any above, further comprising one or more aspects of the exemplary embodiments of the invention as described elsewhere herein, and, in particular, one or more aspects of the exemplary embodiments of the invention as relating to exemplary apparatus described herein.

(4) In another exemplary embodiment, an apparatus comprising: means for sending a multicast transmission to a base station in a wireless communication system, where the multicast transmission is for a plurality of receiving devices including a local receiving device, where the apparatus and the local receiving device are members of a local cluster that is at least partially located in a cell serviced by the base station; means for receiving a transmission of feedback information as it is transmitted from the local receiving device to the base station; and means, in response to the source device determining that the feedback information comprises an indication that the local receiving device did not correctly receive the multicast transmission, for sending a retransmission of the multicast transmission directly to the local receiving device.

An apparatus as above, where the means for sending comprises at least one transmitter and the means for receiving comprises at least one receiver. An apparatus as in any above, where the apparatus comprises at least one of a user equipment, a mobile station, a mobile device, a mobile node, a mobile computer, a mobile computing device, a personal digital assistant and a source device. An apparatus as in any above, further comprising one or more aspects of the exemplary embodiments of the invention as described elsewhere herein, and, in particular, one or more aspects of the exemplary embodiments of the invention as relating to exemplary apparatus described herein.

(5) In another exemplary embodiment, an apparatus comprising: first transmission circuitry configured to send a multicast transmission to a base station in a wireless communication system, where the multicast transmission is for a plurality of receiving devices including a local receiving device, where the apparatus and the local receiving device are members of a local cluster that is at least partially located in a cell serviced by the base station; reception circuitry configured to receive a transmission of feedback information as it is transmitted from the local receiving device to the base station; and second transmission circuitry configured, in response to determining that the feedback information comprises an indication that the local receiving device did not correctly receive the multicast transmission, to send a retransmission of the multicast transmission directly to the local receiving device.

An apparatus as above, where the first transmission circuitry comprises the second transmission circuitry. An apparatus as in any above, where the apparatus comprises at least one of a user equipment, a mobile station, a mobile device, a mobile node, a mobile computer, a mobile computing device, a personal digital assistant and a source device. An apparatus as in any above, where the apparatus comprises at least one integrated circuit. An apparatus as in any above, further comprising one or more aspects of the exemplary embodiments of the invention as described elsewhere herein, and, in particular, one or more aspects of the exemplary embodiments of the invention as relating to exemplary apparatus described herein.

Figure 10:
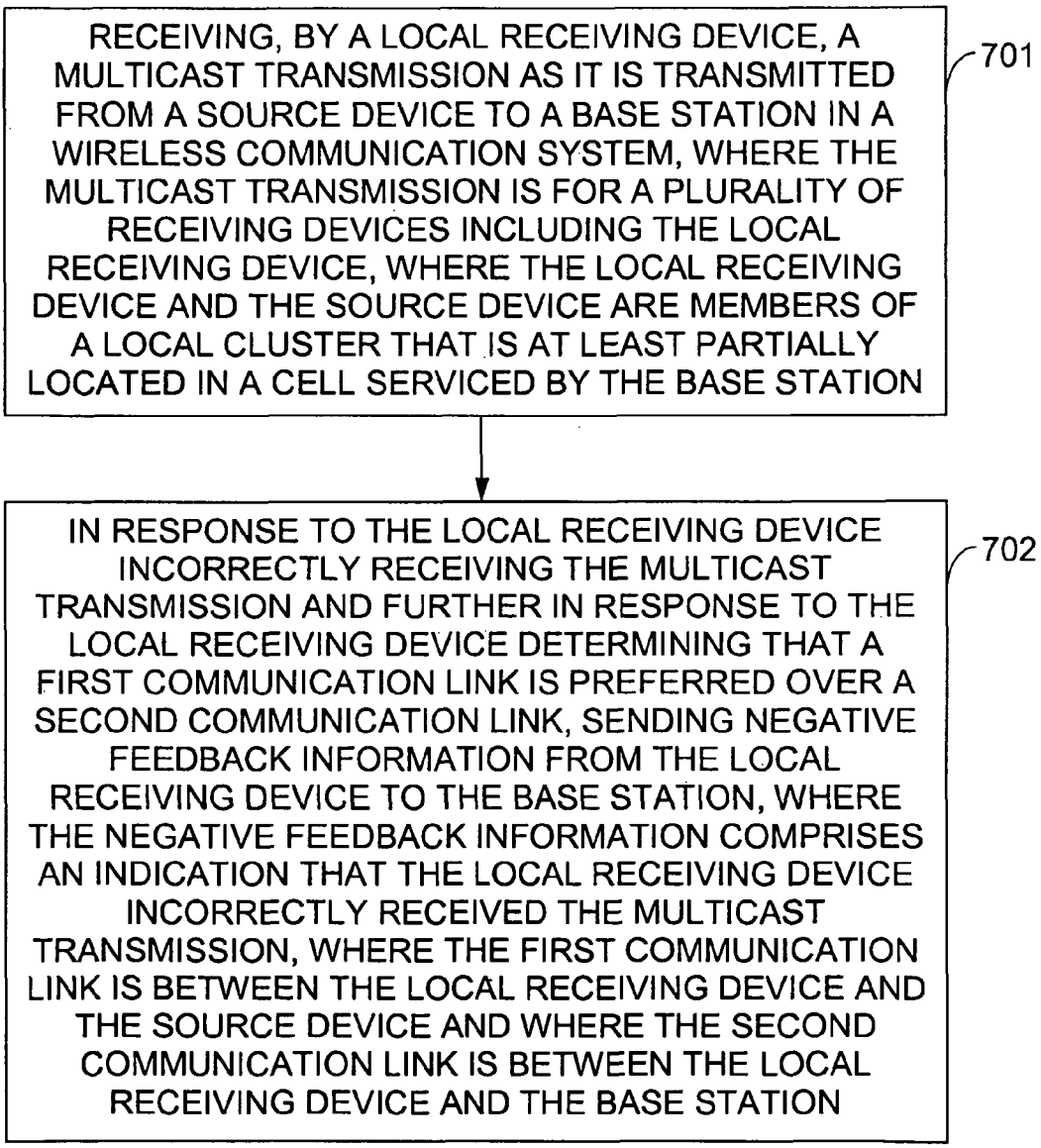
FIG. 10 is a logic flow diagram that illustrates the operation of a further exemplary method, and a result of execution of computer program instructions embodied on a computer readable memory, in accordance with the exemplary embodiments of this invention.

(6) In another exemplary embodiment, and with reference to FIG. 10, a method comprising: receiving, by a local receiving device, a multicast transmission as it is transmitted from a source device to a base station in a wireless communication system, where the multicast transmission is for a plurality of receiving devices including the local receiving device, where the local receiving device and the source device are members of a local cluster that is at least partially located in a cell serviced by the base station (701); and in response to the local receiving device incorrectly receiving the multicast transmission and further in response to the local receiving device determining that a first communication link is preferred over a second communication link, sending negative feedback information from the local receiving device to the base station, where the negative feedback information comprises an indication that the local receiving device incorrectly received the multicast transmission, where the first communication link is between the local receiving device and the source device and where the second communication link is between the local receiving device and the base station (702).

A method as in any above, further comprising: in response to the local device sending the negative feedback information to the base station, receiving, by the local device, a retransmission of the multicast transmission directly from the source device. A method as in any above, where the retransmission is received directly from the source as a device-to-device communication via the first communication link. A method as in any above, further comprising: in response to the local receiving device incorrectly receiving the multicast transmission and further in response to the local receiving device determining that the second communication link is preferred over the first communication link, not sending any feedback information from the local receiving device to the base station or to the source device. A method as in any above, further comprising: in response to the local receiving device not sending any feedback information to the base station, receiving, by the local receiving device, a retransmission of the multicast transmission from the base station A method as in any above, where the retransmission is received from the base station via the second communication link. A method as in any above, where the negative feedback is configured to provoke a direct retransmission from the source device to the local receiving device via the first communication link. A method as in any above, where not sending any feedback information is configured to provoke a retransmission from the base station via the second communication link. A method as in any above, further comprising: in response to the local receiving device correctly receiving the multicast transmission, sending positive feedback information (e.g., an ACK) from the local receiving device to the base station, where the positive feedback information comprises an indication that the local receiving device correctly received the multicast transmission.

A method as in any above, further comprising: obtaining allocation information for resources that are allocated to the source device for the multicast transmission. A method as in any above, further comprising: receiving, by the local receiving device, allocation information from the source device, where the allocation information is for resources that are allocated to the source device for the multicast transmission. A method as in any above, further comprising: receiving, by the local receiving device, allocation information from the source device, where the allocation information is for resources that are allocated to the source device for the multicast transmission, where the allocation information is received as radio level in-band signaling. A method as in any above, further comprising: receiving, by the local receiving device, an allocation request as it is transmitted from the source device to the base station. A method as in any above, further comprising: receiving, by the local receiving device, allocation information as it is transmitted from the base station to the source device.

A method as in any above, where the feedback information comprises an ACK or a NACK. A method as in any above, where the retransmission is not sent via the base station. A method as in any above, where the multicast transmission is received at a cellular uplink power. A method as in any above, where the retransmission is received at a D2D power. A method as in any above, where the retransmission is received at a D2D power that is less than a cellular uplink power. A method as in any above, where the multicast transmission is not received via the base station. A method as in any above, where the retransmission is not received via the base station. A method as in any above, where the feedback information is not addressed to the source device. A method as in any above, where the local receiving device comprises at least one of a user equipment, a mobile station, a mobile device, a mobile node, a mobile computer, a mobile computing device and a personal digital assistant. A method as in any above, where the wireless communication system comprises an evolved universal terrestrial radio access network (E-UTRAN). A method as in any above, where the wireless communication system comprises a long term evolution of universal terrestrial radio access network (LTE). A method as in any above, where the wireless communication system comprises a long term evolution of universal terrestrial radio access network-advanced (LTE-A).

A method as in any above, implemented as (e.g., performed by) a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A method as in any above, further comprising one or more aspects of the exemplary embodiments of the invention as described elsewhere herein, and, in particular, one or more aspects of the exemplary embodiments of the invention as relating to exemplary methods described herein.

(7) In another exemplary embodiment, a program storage device readable by a machine, tangibly embodying a program of instructions executable by the machine for performing operations, said operations comprising: receiving a multicast transmission as it is transmitted from a source device to a base station in a wireless communication system, where the multicast transmission is for a plurality of receiving devices including the machine, where the machine and the source device are members of a local cluster that is at least partially located in a cell serviced by the base station (701); and in response to incorrectly receiving the multicast transmission and further in response to determining that a first communication link is preferred over a second communication link, sending negative feedback information to the base station, where the negative feedback information comprises an indication that the multicast transmission was incorrectly received, where the first communication link is between the machine and the source device and where the second communication link is between the machine and the base station (702).

A program storage device as in any above, where the machine comprises at least one of a user equipment, a mobile station, a mobile device, a mobile node, a mobile computer, a mobile computing device, a personal digital assistant and a local receiving device. A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described elsewhere herein, and, in particular, one or more aspects of the exemplary embodiments of the invention as relating to exemplary methods described herein.

(8) In another exemplary embodiment, an apparatus comprising: at least one processor; and at least one memory including computer program code, the at least one memory and the computer program code being configured to, with the at least one processor, cause the apparatus at least to perform: receive a multicast transmission as it is transmitted from a source device to a base station in a wireless communication system, where the multicast transmission is for a plurality of receiving devices including the apparatus, where the apparatus and the source device are members of a local cluster that is at least partially located in a cell serviced by the base station; and in response to incorrectly receiving the multicast transmission and further in response to determining that a first communication link is preferred over a second communication link, send negative feedback information to the base station, where the negative feedback information comprises an indication that the multicast transmission was incorrectly received, where the first communication link is between the apparatus and the source device and where the second communication link is between the apparatus and the base station.

An apparatus as in any above, where the apparatus comprises at least one of a user equipment, a mobile station, a mobile device, a mobile node, a mobile computer, a mobile computing device, a personal digital assistant and a local receiving device. An apparatus as in any above, further comprising one or more aspects of the exemplary embodiments of the invention as described elsewhere herein, and, in particular, one or more aspects of the exemplary embodiments of the invention as relating to exemplary apparatus described herein.

(9) In another exemplary embodiment, an apparatus comprising: means for receiving a multicast transmission as it is transmitted from a source device to a base station in a wireless communication system, where the multicast transmission is for a plurality of receiving devices including the apparatus, where the apparatus and the source device are members of a local cluster that is at least partially located in a cell serviced by the base station; and means, in response to incorrectly receiving the multicast transmission and further in response to determining that a first communication link is preferred over a second communication link, for sending negative feedback information to the base station, where the negative feedback information comprises an indication that the multicast transmission was incorrectly received, where the first communication link is between the apparatus and the source device and where the second communication link is between the apparatus and the base station.

An apparatus as in any above, where the apparatus comprises at least one of a user equipment, a mobile station, a mobile device, a mobile node, a mobile computer, a mobile computing device, a personal digital assistant and a local receiving device. An apparatus as in any above, further comprising one or more aspects of the exemplary embodiments of the invention as described elsewhere herein, and, in particular, one or more aspects of the exemplary embodiments of the invention as relating to exemplary apparatus described herein.

(10) In another exemplary embodiment, an apparatus comprising: reception circuitry configured to receive a multicast transmission as it is transmitted from a source device to a base station in a wireless communication system, where the multicast transmission is for a plurality of receiving devices including the apparatus, where the apparatus and the source device are members of a local cluster that is at least partially located in a cell serviced by the base station; and transmission circuitry configured, in response to incorrectly receiving the multicast transmission and further in response to determining that a first communication link is preferred over a second communication link, to send negative feedback information to the base station, where the negative feedback information comprises an indication that the multicast transmission was incorrectly received, where the first communication link is between the apparatus and the source device and where the second communication link is between the apparatus and the base station.

An apparatus as in any above, where the apparatus comprises at least one of a user equipment, a mobile station, a mobile device, a mobile node, a mobile computer, a mobile computing device, a personal digital assistant and a local receiving device. An apparatus as in any above, where the apparatus comprises at least one integrated circuit. An apparatus as in any above, further comprising one or more aspects of the exemplary embodiments of the invention as described elsewhere herein, and, in particular, one or more aspects of the exemplary embodiments of the invention as relating to exemplary apparatus described herein.

Figure 11:
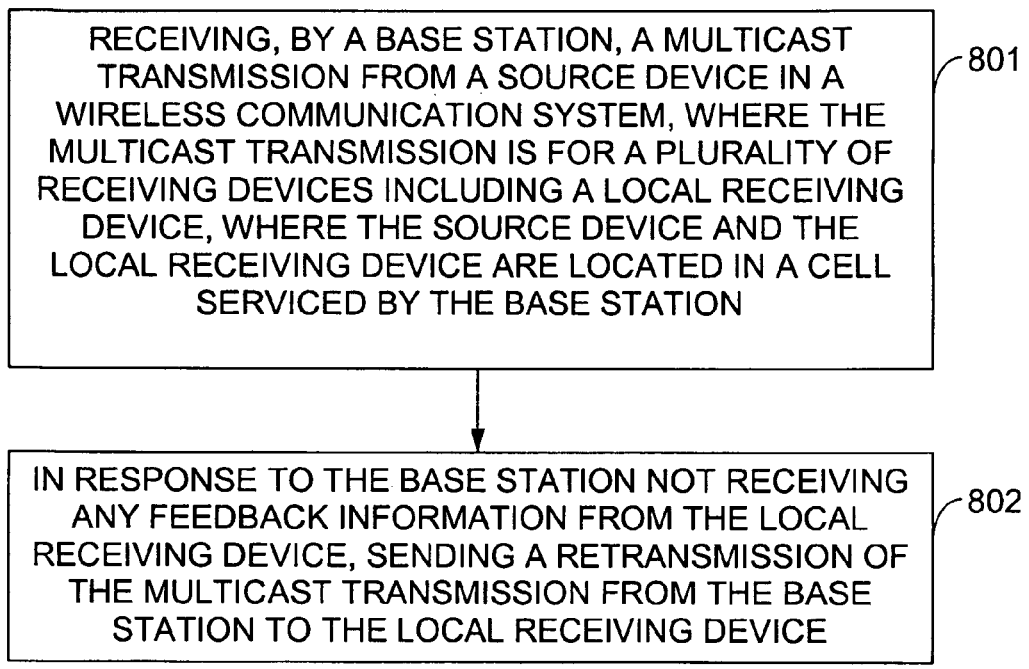
FIG. 11 is a logic flow diagram that illustrates the operation of another exemplary method, and a result of execution of computer program instructions embodied on a computer readable memory, in accordance with the exemplary embodiments of this invention.

(11) In another exemplary embodiment, and with reference to FIG. 11, a method comprising: receiving, by a base station, a multicast transmission from a source device in a wireless communication system, where the multicast transmission is for a plurality of receiving devices including a local receiving device, where the source device and the local receiving device are located in a cell serviced by the base station (801); and in response to the base station not receiving any feedback information from the local receiving device, sending a retransmission of the multicast transmission from the base station to the local receiving device (802).

A method as in any above, further comprising: receiving second feedback information from the local receiving device, where the second feedback information comprises an indication of whether the local receiving device correctly received the retransmission. A method as in any above, further comprising: in response to the base station receiving negative feedback information from the local receiving device, not sending the retransmission of the multicast transmission from the base station to the local receiving device, where the negative feedback information comprises an indication that the local receiving device incorrectly received the multicast transmission. A method as in any above, further comprising: receiving, by the base station, a request for a resource allocation from the source device, where the requested resource allocation is for the multicast transmission; allocating resources for the multicast transmission; and sending a response from the base station to the source device, where the response comprises the resource allocation. A method as in any above, where the base station comprises an evolved Node B (eNB).

A method as in any above, further comprising: in response to the base station receiving positive feedback information from the local receiving device, not sending the retransmission of the multicast transmission from the base station to the local receiving device, where the positive feedback information comprises an indication that the local receiving device correctly received the multicast transmission. A method as in any above, further comprising: sending the multicast transmission from the base station to another base station, where at least one of the plurality of receiving devices is located in another cell that is serviced by the other base station. A method as in any above, where the request for the resource allocation is received using a local cluster RNTI.

A method as in any above, where the feedback information comprises an ACK or a NACK. A method as in any above, where the retransmission is not sent via the base station. A method as in any above, where the retransmission is sent via the base station. A method as in any above, where the multicast transmission is received at a cellular uplink power. A method as in any above, where the feedback information is not addressed to the source device. A method as in any above, where the wireless communication system comprises an evolved universal terrestrial radio access network (E-UTRAN). A method as in any above, where the wireless communication system comprises a long term evolution of universal terrestrial radio access network (LTE). A method as in any above, where the wireless communication system comprises an advanced long term evolution of universal terrestrial radio access network (LTE-A).

A method as in any above, implemented as (e.g., performed by) a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A method as in any above, further comprising one or more aspects of the exemplary embodiments of the invention as described elsewhere herein, and, in particular, one or more aspects of the exemplary embodiments of the invention as relating to exemplary methods described herein.

(12) In another exemplary embodiment, a program storage device readable by a machine, tangibly embodying a program of instructions executable by the machine for performing operations, said operations comprising: receiving a multicast transmission from a source device in a wireless communication system, where the multicast transmission is for a plurality of receiving devices including a local receiving device, where the source device and the local receiving device are located in a cell serviced by the machine (801); and in response to not receiving any feedback information from the local receiving device, sending a retransmission of the multicast transmission to the local receiving device (802).

A program storage device as in any above, where the machine comprises abase station or an evolved Node B (eNB). A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described elsewhere herein, and, in particular, one or more aspects of the exemplary embodiments of the invention as relating to exemplary methods described herein.

(13) In another exemplary embodiment, an apparatus comprising: at least one processor; and at least one memory including computer program code, the at least one memory and the computer program code being configured to, with the at least one processor, cause the apparatus at least to perform: receive a multicast transmission from a source device in a wireless communication system, where the multicast transmission is for a plurality of receiving devices including a local receiving device, where the source device and the local receiving device are located in a cell serviced by the apparatus; and in response to not receiving any feedback information from the local receiving device, send a retransmission of the multicast transmission to the local receiving device.

An apparatus as in any above, where the apparatus comprises a base station or an eNB. An apparatus as in any above, further comprising one or more aspects of the exemplary embodiments of the invention as described elsewhere herein, and, in particular, one or more aspects of the exemplary embodiments of the invention as relating to exemplary apparatus described herein.

(14) In another exemplary embodiment, an apparatus comprising: means for receiving a multicast transmission from a source device in a wireless communication system, where the multicast transmission is for a plurality of receiving devices including a local receiving device, where the source device and the local receiving device are located in a cell serviced by the apparatus; and means, in response to not receiving any feedback information from the local receiving device, for sending a retransmission of the multicast transmission to the local receiving device.

An apparatus as in any above, where the apparatus comprises a base station or an eNB. An apparatus as in any above, further comprising one or more aspects of the exemplary embodiments of the invention as described elsewhere herein, and, in particular, one or more aspects of the exemplary embodiments of the invention as relating to exemplary apparatus described herein.

(15) In another exemplary embodiment, an apparatus comprising: reception circuitry configured to receive a multicast transmission from a source device in a wireless communication system, where the multicast transmission is for a plurality of receiving devices including a local receiving device, where the source device and the local receiving device are located in a cell serviced by the apparatus; and transmission circuitry configured, in response to not receiving any feedback information from the local receiving device, to send a retransmission of the multicast transmission to the local receiving device.

An apparatus as in any above, where the apparatus comprises a base station or an evolved Node B (eNB). An apparatus as in any above, where the apparatus comprises at least one integrated circuit. An apparatus as in any above, further comprising one or more aspects of the exemplary embodiments of the invention as described elsewhere herein, and, in particular, one or more aspects of the exemplary embodiments of the invention as relating to exemplary apparatus described herein.

(16) In another exemplary embodiment, a system comprising: a first apparatus (e.g., a source device) as described above in (3); a second apparatus (e.g., a local receiving device) as described above in (8); and a third apparatus (e.g., a base station) as described above in (13).

(17) In another exemplary embodiment, a system comprising: a first apparatus (e.g., a source device) as described above in (4); a second apparatus (e.g., a local receiving device) as described above in (9); and a third apparatus (e.g., abase station) as described above in (14).

(18) In another exemplary embodiment, a system comprising: a first apparatus (e.g., a source device) as described above in (5); a second apparatus (e.g., a local receiving device) as described above in (10); and a third apparatus (e.g., abase station) as described above in (15).

An system as in any above, further comprising one or more aspects of the exemplary embodiments of the invention as described elsewhere herein, and, in particular, one or more aspects of the exemplary embodiments of the invention as relating to exemplary apparatus described herein.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device (e.g., a computer-readable medium, a memory) readable by a machine (e.g., a computer, a mobile station, a mobile device, a mobile node), tangibly embodying a program of instructions (e.g., a program, a computer program) executable by the machine (e.g., by a processor, by a processor of the machine) for performing operations. The operations comprise steps of utilizing the exemplary embodiments or steps of the method.

The various blocks shown in FIGS. 8-11 may be viewed as method steps, as operations that result from operation of computer program code and/or as one or more coupled components (e.g., function blocks, circuits, integrated circuits, logic circuit elements) constructed to carry out the associated function(s). The blocks may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangement of the blocks shown in FIGS. 8-11 should be considered merely exemplary and non-limiting. It should be appreciated that the blocks may correspond to one or more functions and/or operations that may be performed in any order (e.g., any practicable, suitable and/or feasible order) and/or concurrently (e.g., as practicable, suitable and/or feasible) so as to implement one or more of the exemplary embodiments of the invention. In addition, one or more additional steps, functions and/or operations may be utilized in conjunction with those illustrated in FIGS. 8-11 so as to implement one or more further exemplary embodiments of the invention, such as those described in further detail herein.

That is, the non-limiting, exemplary embodiments of the invention shown in FIGS. 8-11 may be implemented, practiced or utilized in conjunction with one or more further aspects in any combination (e.g., any combination that is practicable, suitable and/or feasible) and are not limited only to the blocks, steps, functions and/or operations illustrated in FIGS. 8-11.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controllers, other computing devices and/or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems that utilize D2D communication, for example.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. For example, while described above primarily in relation UEs, the exemplary embodiments of the invention are not limited for use therewith and, in some exemplary embodiments, may be utilized in conjunction with different types of electronic devices, such as fixed computers, for example. However, all such and similar modifications of the teachings of this invention will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
sending a multicast transmission from a source device to a base station in a wireless communication system, where the source device is user equipment, where the multicast transmission is for a plurality of receiving devices including a local receiving device, where the source device and the local receiving device are members of a local cluster that is at least partially located in a cell serviced by the base station;
receiving, by the source device, a transmission of feedback information as it is transmitted from the local receiving device to the base station; and
in response to the source device determining that the feedback information comprises an indication that the local receiving device did not correctly receive the multicast transmission, sending a retransmission of the multicast transmission from the source device directly to the local receiving device.

2. The method as in claim 1, further comprising: sending a request for a resource allocation from the source device to the base station, where the requested resource allocation is for the multicast transmission; and receiving, by the source device, a response from the base station, where the response comprises the resource allocation.

3. The method as in claim 1, where the retransmission comprises a device-to-device communication.

4. The method as in claim 1, further comprising: receiving, by the source device, second feedback information from the local receiving device, where the second feedback information comprises an indication of whether the local receiving device correctly received the retransmission.

5. The method as in claim 1, where the multicast transmission is sent from the source device to the base station in response to the source device determining that at least one of the plurality of receiving devices is located in a different cell that is serviced by a different base station.

6. An apparatus comprising:
at least one processor; and
at least one memory including computer program code, the at least one memory and the computer program code being configured, with the at least one processor, to cause the apparatus at least to perform: send a multicast transmission to a base station in a wireless communication system, where the multicast transmission is for a plurality of receiving devices including a local receiving device, where the apparatus comprises a source device, where the source device is user equipment, and where the source device and the local receiving device are members of a local cluster that is at least partially located in a cell serviced by the base station; receive a transmission of feedback information as it is transmitted from the local receiving device to the base station; and in response to determining that the feedback information comprises an indication that the local receiving device did not correctly receive the multicast transmission, send a retransmission of the multicast transmission directly to the local receiving device.

7. The apparatus as in claim 6, where the at least one memory and the computer program code are further configured, with the at least one processor, to cause the apparatus at least to perform: send a request for a resource allocation to the base station, where the requested resource allocation is for the multicast transmission; and receive a response from the base station, where the response comprises the resource allocation.

8. The apparatus as in claim 6, where the retransmission comprises a device-to-device communication.

9. The apparatus as in claim 6, where the at least one memory and the computer program code are further configured, with the at least one processor, to cause the apparatus at least to perform: receive second feedback information from the local receiving device, where the second feedback information comprises an indication of whether the local receiving device correctly received the retransmission.

10. A method comprising:
receiving, by a local receiving device, a multicast transmission as it is transmitted from a source device to a base station in a wireless communication system, where the source device is user equipment, where the multicast transmission is for a plurality of receiving devices including the local receiving device, where the local receiving device and the source device are members of a local cluster that is at least partially located in a cell serviced by the base station; and
in response to the local receiving device incorrectly receiving the multicast transmission and further in response to the local receiving device determining that a first communication link is preferred over a second communication link, sending negative feedback information from the local receiving device to the base station, where the negative feedback information comprises an indication that the local receiving device incorrectly received the multicast transmission, where the first communication link is between the local receiving device and the source device and where the second communication link is between the local receiving device and the base station.

11. The method as in claim 10, further comprising: in response to the local device sending the negative feedback information to the base station, receiving, by the local device, a retransmission of the multicast transmission directly from the source device.

12. The method as in claims 10, where the negative feedback is configured to provoke a direct retransmission from the source device to the local receiving device via the first communication link.

13. The method as in claim 10, further comprising: in response to the local receiving device incorrectly receiving the multicast transmission and further in response to the local receiving device determining that the second communication link is preferred over the first communication link, not sending any feedback information from the local receiving device to the base station or the source device.

14. The method as in claim 13, further comprising: in response to the local receiving device not sending any feedback information to the base station, receiving, by the local receiving device, a retransmission of the multicast transmission from the base station.

15. An apparatus comprising:
at least one processor; and
at least one memory including computer program code, the at least one memory and the computer program code being configured, with the at least one processor, to cause the apparatus at least to perform: receive a multicast transmission as it is transmitted from a source device to a base station in a wireless communication system, where the source device is user equipment, where the multicast transmission is for a plurality of receiving devices including the apparatus, where the apparatus and the source device are members of a local cluster that is at least partially located in a cell serviced by the base station; and in response to incorrectly receiving the multicast transmission and further in response to determining that a first communication link is preferred over a second communication link, send negative feedback information to the base station, where the negative feedback information comprises an indication that the multicast transmission was incorrectly received, where the first communication link is between the apparatus and the source device and where the second communication link is between the apparatus and the base station.

16. The apparatus as in claim 15, where the at least one memory and the computer program code are further configured, with the at least one processor, to cause the apparatus at least to perform: in response to sending the negative feedback information to the base station, receive a retransmission of the multicast transmission directly from the source device.

17. The apparatus as in claim 15, where the negative feedback is configured to provoke a direct retransmission from the source device via the first communication link.

18. The apparatus as in claim 15, where the at least one memory and the computer program code are further configured, with the at least one processor, to cause the apparatus at least to perform: in response to incorrectly receiving the multicast transmission and further in response to determining that the second communication link is preferred over the first communication link, not sending any feedback information to the base station or the source device.

19. A method comprising:
receiving, by a base station, a multicast transmission from a source device in a wireless communication system, where the source device is user equipment, where the multicast transmission is for a plurality of receiving devices including a local receiving device, where the source device and the local receiving device are located in a cell serviced by the base station; and
in response to the base station not receiving any feedback information from the local receiving device, sending a retransmission of the multicast transmission from the base station to the local receiving device.

20. The method as in claim 19, further comprising: receiving, by the base station, second feedback information from the local receiving device, where the second feedback information comprises an indication of whether the local receiving device correctly received the retransmission.

21. The method as in claim 19, further comprising: in response to the base station receiving negative feedback information from the local receiving device, not sending the retransmission of the multicast transmission from the base station to the local receiving device, where the negative feedback information comprises an indication that the local receiving device incorrectly received the multicast transmission.

22. The method as in claim 19, further comprising: receiving, by the base station, a request for a resource allocation from the source device, where the requested resource allocation is for the multicast transmission; allocating resources for the multicast transmission; and sending a response from the base station to the source device, where the response comprises the resource allocation.

23. An apparatus comprising:
at least one processor; and
at least one memory including computer program code, the at least one memory and the computer program code being configured, with the at least one processor, to cause the apparatus at least to perform: receive a multicast transmission from a source device in a wireless communication system, where the source device is user equipment, where the multicast transmission is for a plurality of receiving devices including a local receiving device, where the source device and the local receiving device are located in a cell serviced by the apparatus; and
in response to not receiving any feedback information from the local receiving device, send a retransmission of the multicast transmission to the local receiving device.

24. The apparatus as in claim 23, where the at least one memory and the computer program code are further configured, with the at least one processor, to cause the apparatus at least to perform: receive second feedback information from the local receiving device, where the second feedback information comprises an indication of whether the local receiving device correctly received the retransmission.

25. The apparatus as in claim 23, where the at least one memory and the computer program code are further configured, with the at least one processor, to cause the apparatus at least to perform: in response to receiving negative feedback information from the local receiving device, not sending the retransmission of the multicast transmission to the local receiving device, where the negative feedback information comprises an indication that the local receiving device incorrectly received the multicast transmission.

26. The apparatus as in claim 23, where the at least one memory and the computer program code are further configured, with the at least one processor, to cause the apparatus at least to perform: receive a request for a resource allocation from the source device, where the requested resource allocation is for the multicast transmission; allocate resources for the multicast transmission; and send a response to the source device, where the response comprises the resource allocation.

* * * * *